(12) United States Patent
Hassell et al.

(10) Patent No.: US 10,407,316 B2
(45) Date of Patent: Sep. 10, 2019

(54) EXTRACTION OF PRODUCTS FROM TITANIUM-BEARING MINERALS

(71) Applicant: Avertana Limited, Auckland (NZ)

(72) Inventors: David Jonathan Hassell, Auckland (NZ); James Kevin Obern, Auckland (NZ); Sean Daniel James Molloy, Auckland (NZ); Sherif Owen Zaki Emad Marshall Ibrahim, Auckland (NZ); Mohammed Shereez Ali, Auckland (NZ)

(73) Assignee: AVERTANA LIMITED, Auckland (NZ)

( * ) Notice: Subject to any disclaimer, the term of this patent is extended or adjusted under 35 U.S.C. 154(b) by 0 days.

(21) Appl. No.: 15/324,211

(22) PCT Filed: Jul. 8, 2015

(86) PCT No.: PCT/NZ2015/050085
§ 371 (c)(1),
(2) Date: Jan. 5, 2017

(87) PCT Pub. No.: WO2016/007021
PCT Pub. Date: Jan. 14, 2016

(65) Prior Publication Data
US 2017/0174525 A1    Jun. 22, 2017

(30) Foreign Application Priority Data

Jul. 8, 2014  (NZ) .......................... 627180
Jul. 8, 2014  (NZ) .......................... 627185
Jul. 8, 2014  (NZ) .......................... 627187

(51) Int. Cl.
*C01G 23/053*   (2006.01)
*C01F 5/40*   (2006.01)
(Continued)

(52) U.S. Cl.
CPC .......... *C01G 23/0532* (2013.01); *C01B 33/12* (2013.01); *C01B 33/126* (2013.01);
(Continued)

(58) Field of Classification Search
CPC ............................ C01G 23/0532; C01F 5/40
See application file for complete search history.

(56) References Cited

U.S. PATENT DOCUMENTS

| | | |
|---|---|---|
| 1,793,501 A | 2/1931 | Lubowsky |
| 2,830,892 A | 4/1958 | Udy |

(Continued)

FOREIGN PATENT DOCUMENTS

| | | |
|---|---|---|
| AU | 781370 | 10/2001 |
| CA | 2363031 | 8/2000 |

(Continued)

OTHER PUBLICATIONS

International Search Report in connection with PCT International Application No. PCT/NZ2015/050085.
(Continued)

*Primary Examiner* — Melissa S Swain
(74) *Attorney, Agent, or Firm* — John P. White; Cooper & Dunham LLP

(57) ABSTRACT

The invention relates to a process for extracting metals and salts from titanium-bearing minerals such as perovskite. More particularly, although not exclusively, the invention relates to extracting titanium dioxide and optionally other compounds from melter slag derived from an iron-making process.

22 Claims, 5 Drawing Sheets

(51) Int. Cl.
*C01F 7/74* (2006.01)
*C22B 34/12* (2006.01)
*C22B 7/04* (2006.01)
*C01G 23/047* (2006.01)
*C01F 11/46* (2006.01)
*C01B 33/12* (2006.01)
*C22B 7/00* (2006.01)

(52) U.S. Cl.
CPC .......... *C01F 5/40* (2013.01); *C01F 7/74* (2013.01); *C01F 7/748* (2013.01); *C01F 11/46* (2013.01); *C01F 11/468* (2013.01); *C01G 23/0475* (2013.01); *C22B 7/007* (2013.01); *C22B 7/04* (2013.01); *C22B 34/12* (2013.01); *C22B 34/125* (2013.01); *C22B 34/1259* (2013.01); *C22B 34/1286* (2013.01); *Y02P 10/212* (2015.11); *Y02P 10/218* (2015.11); *Y02P 10/226* (2015.11); *Y02P 10/23* (2015.11)

(56) References Cited

U.S. PATENT DOCUMENTS

| | | | |
|---|---|---|---|
| 3,056,689 | A | 10/1962 | Grimsby et al. |
| 4,288,418 | A | 9/1981 | Davis et al. |
| 4,552,730 | A | 11/1985 | Shirts et al. |
| 4,562,049 | A * | 12/1985 | Shirts .......... C01F 11/46 423/82 |
| 4,663,131 | A | 5/1987 | Gerken et al. |
| 5,277,816 | A | 1/1994 | Watanabe |
| 6,048,505 | A | 4/2000 | Miller et al. |
| 6,090,354 | A | 7/2000 | Russell et al. |
| 6,248,302 | B1 | 6/2001 | Barnett et al. |
| 6,375,923 | B1 | 4/2002 | Duyvesteyn et al. |
| 6,440,383 | B1 | 8/2002 | Duyvesteyn et al. |
| 6,447,738 | B1 | 9/2002 | Rendall et al. |
| 6,548,039 | B1 | 4/2003 | Duyvesteyn et al. |
| 6,713,038 | B2 | 3/2004 | Zhou et al. |
| 7,625,536 | B2 | 12/2009 | Smith et al. |
| 7,771,679 | B2 | 8/2010 | Jha et al. |
| 7,964,164 | B2 | 6/2011 | Cooke et al. |
| 8,021,634 | B2 | 9/2011 | Roche et al. |
| 8,728,437 | B2 | 5/2014 | Stuart et al. |
| 8,728,937 | B2 | 5/2014 | Stuart et al. |
| 8,834,600 | B2 | 9/2014 | Jha et al. |
| 9,073,797 | B2 | 7/2015 | Demosthenous et al. |
| 9,458,522 | B2 | 10/2016 | Manson |
| 2004/0136899 | A1 | 7/2004 | Bekker et al. |
| 2004/0237719 | A1 | 12/2004 | Becker et al. |
| 2006/0153768 | A1 | 7/2006 | Roche et al. |
| 2008/0124259 | A1 | 5/2008 | Roche et al. |
| 2008/0124262 | A1* | 5/2008 | Roche ............ C01G 23/008 423/83 |
| 2009/0311153 | A1 | 12/2009 | Roche et al. |
| 2015/0299820 | A1 | 10/2015 | Manson |
| 2017/0355612 | A1 | 12/2017 | Krempels |

FOREIGN PATENT DOCUMENTS

| | | |
|---|---|---|
| CN | 86108511 | 6/1988 |
| CN | 1006635 | 1/1990 |
| CN | 1555343 A | 12/2004 |
| CN | 1729304 | 2/2006 |
| CN | 1729305 | 2/2006 |
| CN | 1746126 | 3/2006 |
| CN | 1898401 A | 1/2007 |
| CN | 101535509 | 9/2009 |
| CN | 101553585 | 10/2009 |
| CN | 101898791 A | 12/2010 |
| CN | 101988158 | 3/2011 |
| CN | 101988158 B | 3/2011 |
| CN | 101994012 | 3/2011 |
| CN | 102112399 | 6/2011 |
| CN | 101898791 B | 10/2012 |
| CN | 102745742 | 10/2012 |
| CN | 103112890 A | 5/2013 |
| CN | 103265069 A | 8/2013 |
| CN | 103572058 | 1/2014 |
| CN | 103589872 | 2/2014 |
| CN | 103796955 A | 5/2014 |
| CN | 103880070 | 6/2014 |
| CN | 103882238 | 6/2014 |
| CN | 104045111 | 9/2014 |
| CN | 104310467 | 1/2015 |
| DE | 102012104717 A1 | 12/2012 |
| EP | 0440406 | 1/1991 |
| EP | 0 440 406 A2 | 8/1991 |
| EP | 1 409 410 B1 | 12/2004 |
| EP | 1499752 | 1/2005 |
| EP | 1 341 939 B1 | 9/2005 |
| EP | 2310322 | 4/2011 |
| GB | 351841 | 9/1930 |
| GB | 351841 | 7/1931 |
| IN | 225748 B | 3/2007 |
| IN | 225143 B | 5/2007 |
| IN | 226071 B | 5/2007 |
| IN | 223939 B | 7/2007 |
| JP | WO2013100048 | 5/2015 |
| MY | 121193 A | 12/2005 |
| RU | 2013 128 260 A | 12/2014 |
| WO | WO 01/42520 | 6/2001 |
| WO | WO 01/42520 A1 | 6/2001 |
| WO | WO 02/48412 A1 | 6/2002 |
| WO | WO 2004-035841 | 4/2004 |
| WO | WO 2004-035842 | 4/2004 |
| WO | WO 2004-035843 | 4/2004 |
| WO | WO 2010034083 | 4/2010 |
| WO | WO 2011/015991 A2 | 2/2011 |
| WO | WO 2013/037649 A1 | 3/2013 |
| WO | WO 2013/100963 A1 | 7/2013 |
| WO | WO 2016/112432 A1 | 7/2016 |
| ZA | 200309806 A | 8/2004 |
| ZA | 200307159 | 9/2004 |
| ZA | 200901215 A | 2/2005 |
| ZA | 200603093 | 9/2007 |
| ZA | 200607893 | 2/2008 |
| ZA | 200708987 A | 6/2008 |

OTHER PUBLICATIONS

International Search Report in connection with PCT International Application No. PCT/NZ2015/050085 (Exhibit 3).
Search Report dated Dec. 1, 2017 in connection with corresponding Singaporean Patent Application No. 11201704692P.
Written Opinion dated Jan. 17, 2017 in connection with corresponding Singaporean Patent Application No. 11201704692P.
European Search Report dated Dec. 6, 2017 by the EPO in connection with European Patent Application No. EP 15818843.3.
Bureau of Mines Report Shirts et al 1992 (A. E. Petersen M. B. Shirts and J. P. Allen Production of Titanium Dioxide Pigment From Perovskite Concentrates Acid Sulfation Method Bureau of Mines Report 1992).
T. Jiang H. G. Dong Y. F. Guo G. H. Li & Y. B. Yang (2010) Study on leaching Ti from Ti bearing blast furnace slag by sulphuric acid Mineral Processing and Extractive Metallurgy 119:1 33-38 (Exhibit 4).
Jack L. Henry et al. "The System Aluminium Sulfate—Sulfuric Acid—Water at 60°" Journal of the American Chemical Society vol. 71 No. 4 1, pp. 1142-1144, Apr. 1949 (Exhibit 6).
Neil Paul Lee "The Production of Titanium Dioxide Pigment from Waste N.Z. Steel-making Slag" Victoria University of Wellington, New Zealand, 1997.

* cited by examiner

EXTRACTION OF PRODUCTS FROM TITANIUM-BEARING MINERALS

Cross-Reference to Related Applications

This application is a § 371 national stage of PCT International Application No. PCT/NZ2015/050085, filed Jul. 8, 2015, claiming priority of New Zealand Patent Applications Nos. NZ 627180, filed Jul. 8, 2014, NZ 627185, filed Jul. 8, 2014, and NZ 627187, filed Jul. 8, 2014 the content of each of which is hereby incorporated by reference into the application.

FIELD OF INVENTION

The invention relates to a process for extracting metals and salts from titanium-bearing minerals, and more particularly, although not exclusively, extracting titanium dioxide and optionally other compounds from melter slag derived from an iron-making process.

BACKGROUND

There are numerous reserves of minerals from which valuable constituents cannot currently be recovered through means that are economically viable. The primary reason for this is that the grade of such constituents within the mineral reserves is too low, resulting in large effluent or by-product generation rates.

Melter slag, produced as a by-product during iron and steel making processes, is one such mineral that contains low grades of commercially valuable components, including titanium, aluminium and magnesium. During production of molten-pig iron, impurities are removed as melter slag. For some deposits, the slag is primarily perovskite (calcium titanate) and may typically contain between 20-40% titanium dioxide. Known melter slag extraction processes focus on extraction of titanium, due to it having the highest concentration within melter slag and the highest value. Titanium is a valuable pigment used in a number of commercial applications such as the production of paints, paper, cement and polymers. In melter slag, titanium is present in the form of perovskite, a titanium-calcium oxide crystalline structure from which recovery is difficult. An example of a known method of extraction of titanium from perovskite includes reacting perovskite with carbon at high temperatures in an electrical furnace to produce titanium carbide. The titanium carbide is then chlorinated to produce titanium tetrachloride. Unfortunately, this method is energy intensive and the carbide produced has an extremely high melting point, which creates handling problems in the furnace.

Another method of extracting titanium from perovskite is that published in CA1,052,581. In this method, perovskite is treated by roasting at 1200° C. in hydrogen sulphide gas. This is followed by leaching to remove calcium and iron sulphides which leaves the titanium as titanium oxides. The disadvantages of this process are the high temperatures and use of highly toxic gas.

Even minor improvements to a process for extracting saleable products from minerals can have a significant impact on the efficiency, and more particularly, the commercial viability, of such a process. The methods detailed above are economically inefficient due to the high temperatures used, and only titanium is extracted by these processes. It is an object of the present invention to provide a method of extraction of products from a titanium-bearing mineral, or to at least provide the public with a useful choice.

SUMMARY OF THE INVENTION

The present invention provides a response to the need in the art. The present invention provides methods for extracting valuable products from titanium-bearing minerals.

In a first aspect, the invention provides a method of recovering titanium dioxide and at least one other product from a particulate material, said method comprising:
    a. contacting the particulate material with sulphuric acid and heating to form a sulphated mixture;
    b. filtering the sulphated mixture to produce a filter cake and a first permeate comprising sulphuric acid;
    c. contacting the filter cake with water to form a sulphated suspension comprising titanyl sulphate;
    d. filtering the sulphated suspension to produce a permeate comprising at least titanyl sulphate, and a retentate comprising insoluble residue;
    e. contacting the permeate comprising at least titanyl sulphate with water to produce a hydrolysis liquor;
    f. hydrolysing the titanyl sulphate; and
    g. separating titanium dioxide hydrate from the hydrolysis liquid,
wherein the at least one other product is selected from the group consisting of calcium sulphate, silica, aluminium sulphate or magnesium sulphate.

In some embodiments, the titanium dioxide hydrate is separated by filtering the hydrolysis liquor to produce a permeate, and a retentate comprising titanium dioxide hydrate. In alternative embodiments, the titanium dioxide hydrate is separated by centrifugation and collection of the precipitate.

In particular embodiments, the insoluble residue comprises at least one product selected from calcium sulphate and silica.

In particular embodiments, the invention provides a method of recovering titanium dioxide and at least one other product from a particulate material comprising greater than 8 m %, greater than 10 m %, greater than 15 m % greater than 20 m % or greater than 25 m % titanium dioxide, and greater than 10 m %, greater than 15 m % or greater than 20 m % silica. In other embodiments, the invention provides a method of recovering titanium dioxide and at least one other product from a particulate material comprising greater than 8 m %, greater than 10 m %, greater than 15 m % greater than 20 m % or greater than 25 m % titanium dioxide, and greater than 15 m %, greater than 20 m % or greater than 25 m % calcium oxide.

In some embodiments, the invention provides a method of recovering titanium dioxide and at least one other product from a particulate material comprising greater than 8 m %, greater than 10 m %, greater than 15 m % greater than 20 m % or greater than 25 m % titanium dioxide, greater than 10 m %, greater than 15 m % or greater than 20 m % silica, and greater than 15 m %, greater than 20 m % or greater than 25 m % calcium oxide.

In some embodiments, the invention provides a method of recovering titanium dioxide and at least one other product from a particulate material comprising a ratio of titanium dioxide to calcium oxide ($TiO_2$:CaO) in the particulate matter of between 0.2 and 3.0, more preferably between 0.3 and 2.5. In particular embodiments, the method further comprises separation of calcium sulphate from the insoluble residue using a floatation process.

In one embodiment, the invention provides a method of recovering titanium dioxide and aluminium sulphate from a particulate material, said method comprising:
  a. contacting the particulate material with sulphuric acid and heating to form a sulphated mixture;
  b. filtering the sulphated mixture to produce a filter cake and a first permeate comprising sulphuric acid;
  c. contacting the filter cake with water to form a sulphated suspension comprising titanyl sulphate;
  d. filtering the sulphated suspension to produce a permeate comprising at least titanyl sulphate, and a retentate comprising insoluble residue;
  e. contacting the permeate comprising at least titanyl sulphate with water to produce a hydrolysis liquor;
  f. hydrolysing the titanyl sulphate;
  g. separating titanium dioxide hydrate from the hydrolysis liquor to produce a permeate comprising aluminium sulphate, and a retentate comprising titanium dioxide hydrate; and
  h. precipitating aluminium sulphate from the permeate; wherein step h. may be carried out after step d or after step g.

In particular embodiments, the method of the first aspect further comprises a step of precipitating aluminium sulphate after step g. In one embodiment, the precipitation comprises the steps of:
  cooling the permeate produced from the hydrolysis liquor to produce a cooled liquor comprising precipitated aluminium sulphate; and
  filtering the cooled liquor to produce a retentate comprising precipitated aluminium sulphate, and a permeate.

In particular embodiments, the method of the first aspect further comprises a step of precipitating aluminium sulphate after step g. wherein the particulate material comprises greater than 8 m %, greater than 10 m %, greater than 15 m % greater than 20 m % or greater than 25 m % titanium dioxide, and greater than 10 m % or greater than 13 m % aluminium oxide.

In particular embodiments, the method of the first aspect further comprises a step of precipitating aluminium sulphate after step g. wherein the particulate material comprises a ratio of titanium dioxide to aluminium oxide ($TiO_2$:$Al_2O_3$) in the particulate matter of approximately 0.2 to 2.6, more preferably 0.25 to 2.1.

In particular embodiments, the method of the first aspect further comprises a step of precipitating aluminium sulphate prior to step f. In one embodiment, the precipitation comprises:
  cooling the permeate comprising at least titanyl sulphate to produce a cooled liquor comprising precipitated aluminium sulphate; and
  filtering the cooled liquor comprising aluminium sulphate to produce a retentate comprising precipitated aluminium sulphate, and a permeate.

In particular embodiments the step of precipitating aluminium sulphate comprises cooling the permeate to between 10° C. and 4° C. such that the aluminium sulphate crystalizes. In preferred embodiments, the permeate comprising aluminium sulphate is cooled to approximately 5° C.

In particular embodiments, greater than 90% of the aluminium sulphate present in the sulphated suspension is recovered.

In particular embodiments, the method of the first aspect further comprises a step of precipitating magnesium sulphate from a permeate comprising magnesium sulphate, wherein the permeate comprising magnesium sulphate is either the hydrolysis liquor (after separation of titanium dioxide hydrate), or the permeate produced following aluminium sulphate precipitation.

In one embodiment, the invention provides a method of recovering titanium dioxide and magnesium sulphate from a particulate material, said method comprising:
  a. contacting the particulate material with sulphuric acid and heating to form a sulphated mixture;
  b. filtering the sulphated mixture to produce a filter cake and a first permeate comprising sulphuric acid;
  c. contacting the filter cake with water to form a sulphated suspension comprising titanyl sulphate;
  d. filtering the sulphated suspension to produce a permeate comprising at least titanyl sulphate, and a retentate comprising insoluble residue;
  e. contacting the permeate comprising at least titanyl sulphate with water to produce a hydrolysis liquor;
  f. hydrolysing the titanyl sulphate;
  g. separating titanium dioxide hydrate from the hydrolysis liquor to produce a permeate comprising magnesium sulphate, and a retentate comprising titanium dioxide hydrate; and
  h. precipitating magnesium sulphate from the permeate.

In one embodiment, the magnesium sulphate is precipitated by the steps of:
  increasing the acid concentration of a permeate comprising magnesium sulphate to form an acidified liquor; and
  filtering the acidified liquor to produce a retentate comprising precipitated magnesium sulphate.

In particular embodiments, the acid concentration of the permeate comprising magnesium sulphate is increased by the addition of sulphuric acid. Preferably the pH of the permeate comprising magnesium sulphate is reduced to less than approximately pH1 by the addition of sulphuric acid. In particular embodiments, the acid concentration of the permeate comprising magnesium sulphate is increased by heating the permeate to remove water. Preferably heating is carried out at boiling point or at a temperature of greater than 130° C. Preferably heating is carried out to achieve a final acid concentration of 90%, or less than approximately pH1.

In particular embodiments, the method of the first aspect further comprises a step of precipitating magnesium sulphate from a permeate comprising magnesium sulphate, wherein the method includes the recovery of titanium dioxide and magnesium sulphate product from a particulate material comprising greater than 8 m %, greater than 10 m %, greater than 15 m % greater than 20 m % or greater than 25 m % titanium dioxide, and greater than 7 m % or greater than 10 m % magnesium oxide.

In particular embodiments, the method of the first aspect further comprises a step of precipitating magnesium sulphate from a permeate comprising magnesium sulphate, wherein the method includes the recovery of titanium dioxide and magnesium sulphate product from a particulate material comprising a ratio of titanium dioxide to magnesium oxide ($TiO_2$:MgO) in the particulate matter of approximately 0.5 to 3.0, more preferably 0.8 to 2.8.

In one embodiment, the step of precipitating magnesium sulphate comprises cooling the acidified liquor or a permeate comprising magnesium sulphate to a temperature where precipitation rate is increased. In another embodiment, the step of precipitating magnesium sulphate comprises:
  cooling the permeate comprising magnesium sulphate to produce a cooled liquor comprising magnesium sulphate; and filtering the cooled liquor comprising magnesium sulphate to produce a retentate comprising precipitated magnesium sulphate, and a permeate.

In preferred embodiments, the permeate comprising magnesium sulphate or the acidified liquor is cooled to less than 4° C., between 0° C. and 4° C. or approximately 3° C.

In particular embodiments, greater than 90% of the magnesium sulphate present in the sulphated suspension is recovered following filtration.

In particular embodiments, the method of the first aspect further comprises:
  precipitation of aluminium sulphate as described above, either before or after hydrolysis; and
  the retentate obtained from the sulphated suspension comprises at least one of calcium sulphate and silica.

In particular embodiments, the method of the first aspect further comprises:
  precipitation of magnesium sulphate as described above; and
  the retentate obtained from the sulphated suspension comprises at least one of calcium sulphate and silica.

In particular embodiments, the method of the first aspect further comprises:
  precipitation of aluminium sulphate as described above, either before or after hydrolysis; and
  precipitation of magnesium sulphate as described above; and
  the retentate obtained from the sulphated suspension comprises at least one of calcium sulphate and silica.

In particular embodiments, the method of the first aspect further comprises:
  precipitation of aluminium sulphate as described above, either before or after hydrolysis; and
  precipitation of magnesium sulphate as described above.

In one embodiment, the invention provides a method of recovering titanium dioxide, aluminium sulphate and magnesium sulphate from a particulate material, said method comprising:
  a. contacting the particulate material with sulphuric acid and heating to form a sulphated mixture;
  b. filtering the sulphated mixture to produce a filter cake and a first permeate comprising sulphuric acid;
  c. contacting the filter cake with water to form a sulphated suspension comprising titanyl sulphate;
  d. filtering the sulphated suspension to produce a permeate comprising at least titanyl sulphate, and a retentate comprising insoluble residue;
  e. contacting the permeate comprising at least titanyl sulphate with water to produce a hydrolysis liquor;
  f. hydrolysing the titanyl sulphate;
  g. separating titanium dioxide hydrate from the hydrolysis liquor to produce a permeate comprising aluminium sulphate and magnesium sulphate, and a retentate comprising titanium dioxide hydrate;
  h. precipitating aluminium sulphate from the permeate; and
  i. precipitating magnesium sulphate from the permeate, wherein step h. may be carried out after step d or after step g.

In particular embodiments of the first aspect, the particulate material is iron slag or obtained from iron slag. In particular embodiments, the particulate material is melter slag from an iron manufacturing process. In particular embodiments, the material is melter slag from a steel manufacturing process.

In particular embodiments, the particulate material comprises i. titanium dioxide and at least one of the following components:
  ii. silica;
  iii. calcium oxide;
  iv. aluminium oxide; and
  v. magnesium oxide, In particular embodiments, the method of the first aspect further comprises the step of grinding raw material comprising components i. to v. to form the particulate material of step a. In particular embodiments, the particulate material has a particle size of less than 180 μm. In preferred embodiments, the particulate material has a particle size from 10 to 180 μm, or from 40 to 110 μm. In particular embodiments, the particulate material has a particle size of approximately 30 μm, 451 μm, 60 μm, 70 μm, 80 μm, 90 μm, or 100 μm.

In particular embodiments, the particulate material comprises greater than 8 m % titanium dioxide. In other embodiments, the particulate material comprises greater than 10 m %, greater than 15 m %. greater than 20 m % or greater than 25 m % titanium dioxide.

In particular embodiments of the first aspect, the particulate material of a. is contacted with 4-10 times its stoichiometric quantity of sulphuric acid. In preferred embodiments, the particulate material of b. is contacted with 5-6, or approximately 6 times its stoichiometric quantity of sulphuric acid.

In particular embodiments, the sulphuric acid concentration is at least 50 m %. In other embodiments, the acid concentration is at least 60 m %, 70 m %, 80 m %, 90 m % or 98 m %.

In particular embodiments of the first aspect, the sulphated mixture is heated to achieve substantially complete sulphation of the oxides (particularly titanium dioxide/calcium titanate) present. In particular embodiments, the sulphated mixture is heated to at least 100° C. following contact with sulphuric acid. In preferred embodiments, the mixture is heated to a maximum of approximately 250° C.

In particular embodiments, the sulphated mixture is heated to a temperature between 130° C. and 200° C., more preferably approximately 150° C.-160° C. In particular embodiments, the mixture is heated for a heating period which allows substantially complete sulphation of the titanium dioxide (and optionally other components) to occur. In one embodiment, the heating period is between 15 minutes and one hour. In particular embodiments, the heating period is at least 30 minutes or approximately 40 minutes. In particular embodiments, step a. occurs, in a reactor.

In particular embodiments of the first aspect, the step of filtering the sulphated mixture further comprises contacting the mixture with compressed air. The temperature of the compressed air is preferably below 85° C. In particular embodiments, the temperature of the compressed air is from 10° C. to 85° C. Preferably, the compressed air is from 30° C. to 85° C., or approximately 50° C., 60° C., 70° C. or 80° C.

In particular embodiments of the first aspect, the sulphuric acid removed from the sulphated mixture is collected for re-use in step a.

In particular embodiments of the first aspect, the permeate comprising at least titanyl sulphate is dehydrated using a membrane to produce a concentrated permeate comprising at least titanyl sulphate in which the metal sulphates are concentrated.

In particular embodiments of the first aspect, the permeate comprising at least titanyl sulphate is heated to remove water and increase the free acidity. Preferably the permeate comprising at least titanyl sulphate is heated to greater than 100° C., more preferably greater than 130° C. and most preferably to greater than 160° C. or to boiling. In particular embodiments, the heated permeate comprising at least titanyl sulphate is filtered to remove residual sulphuric acid and the resulting filter cake (comprising precipitated titanyl sulphate and preferably other precipitated sulphates) is contacted with water to obtain a concentrated permeate comprising at least titanyl sulphate. This permeate may then be subjected to downstream process steps including hydrolysis and optionally precipitation of aluminium/magnesium.

In particular embodiments, the free acidity of the hydrolysis liquor is from 8-25%. In other embodiments, the free acidity of the hydrolysis liquor is from 9-15%.

In particular embodiments of the first aspect, the hydrolysis liquor is heated to a temperature between 85 and 140° C., 80 and 140° C., 90° C. and 120° C., or between 105° C. to 110° C. Preferably the hydrolysis liquor is heated for a period such that substantially all of the titanyl sulphate has reacted. Preferably, the heating period is from one hour to three hours. More preferably from 90 minutes to two hours or approximately 100 minutes. In particular embodiments, the solution is heated for about two hours at a temperature above 85° C. in order for hydrolysis to be completed.

In particular embodiments of the first aspect, the hydrolysis liquor is contacted with water containing titanium dioxide particles. Preferably the titanium dioxide particles are nanoparticles. Preferably, the amount of titanium dioxide particles added to the hydrolysis liquor is between 2 m % and 30 m % of the mass of the titanium dioxide calculated to be present in the liquor. More preferably, between 2 m % and 15 m % and preferably between 5 m % and 9 m %. Preferably, the particle size of the titanium particles added to the liquor is from 2 nm to 10 nm, more preferably 3 to 6 nm.

In particular embodiments of the first aspect, the method further comprises the step of sonicating the hydrolysis liquor to precipitate titanium dioxide hydrate from the solution. Preferably, the hydrolysis liquor is sonicated in the absence of heating.

In one embodiment of the first aspect, the method further comprises the step of calcining the titanium dioxide hydrate. Preferably calcining is carried out at a temperature of between 800 and 1100° C., between 850° C. and 950° C., or between 890 and 910° C.

In a second aspect, the invention provides at least one product produced by the method of the first aspect, the product being selected from:
  a. titanium dioxide;
  b. silica;
  c. calcium sulphate;
  d. aluminium sulphate; or
  e. magnesium sulphate.

In a third aspect, the invention provides a system for the recovery of products from a particulate material, the system comprising:
  a. a sulphation reactor adapted to receive and heat sulphuric acid and particulate material comprising at least titanium dioxide and produce a sulphated mixture;
  b. a first filtration unit adapted to receive the sulphated mixture and produce a first permeate comprising at least sulphuric acid, and a filter cake comprising at least titanyl sulphate;
  c. a hydrolysis reactor adapted to receive a solution comprising titanyl sulphate and heat said solution to produce a hydrolysis liquor;
  d. a separation unit adapted to receive the hydrolysis liquor and separate titanium dioxide hydrate.

In particular embodiments of the third aspect, the separation unit comprises a second filtration unit adapted to receive the hydrolysis liquor and produce a retentate comprising titanium dioxide. In alternative embodiments, the separation unit comprises a centrifugation unit adapted to separate the precipitated titanium dioxide hydrate.

In particular embodiments of the third aspect, the system further comprises at least one precipitation tank to facilitate precipitation of aluminium sulphate or magnesium sulphate.

In particular embodiments, the particulate material further comprises at least one of aluminium oxide, magnesium oxide, calcium oxide or silica.

In particular embodiments, the system further comprises at least one further filtration unit to facilitate separation of precipitated aluminium sulphate or precipitated magnesium sulphate.

In a fourth aspect, the invention provides a method of recovering products from a particulate material comprising the following components:
  i. titanium dioxide;
  ii. silica;
  iii. calcium oxide;
  iv. aluminium oxide; and
  v. magnesium oxide,
  said method comprising:
    a. contacting the particulate material with sulphuric acid and heating to form a sulphated mixture;
    b. filtering the sulphated mixture to produce a filter cake and a first permeate comprising sulphuric acid;
    c. contacting the filter cake with water to form a sulphated suspension comprising titanyl sulphate;
    d. filtering the sulphated suspension to produce a retentate comprising silica and calcium sulphate, and a permeate comprising at least titanyl sulphate;
    e. contacting the permeate comprising at least titanyl sulphate with water to produce a hydrolysis liquor;
    f. heating the hydrolysis liquor to hydrolyse the titanyl sulphate;
    g. separating titanium dioxide hydrate by filtering the hydrolysis liquor to produce a retentate comprising titanium dioxide hydrate and a permeate comprising aluminium sulphate and magnesium sulphate;
    h. precipitating aluminium sulphate and separating the precipitate by filtering the liquor to produce a retentate comprising precipitated aluminium sulphate, and a permeate comprising magnesium sulphate;
    i. precipitating magnesium sulphate and separating the precipitate by filtering the liquor to produce a retentate comprising precipitated magnesium sulphate.

Preferably, the step of precipitating aluminium sulphate in the method of the fourth aspect comprises cooling the permeate comprising aluminium sulphate and magnesium sulphate to produce a cooled liquor comprising precipitated aluminium sulphate; and filtering the cooled liquor to produce a retentate comprising precipitated aluminium sulphate, and a permeate comprising magnesium sulphate.

Preferably, the step of precipitating magnesium sulphate in the method of the fourth aspect comprises increasing the acid concentration of the permeate comprising magnesium sulphate to form an acidified liquor; and filtering the acidified liquor to produce a retentate comprising precipitated magnesium sulphate.

The invention also includes the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

Definitions

Figure 1:
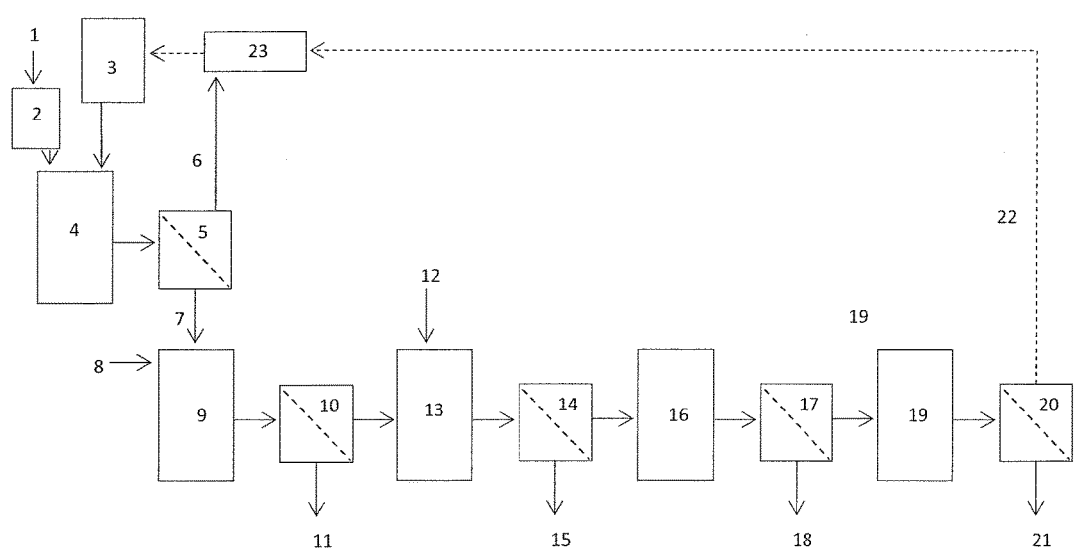
FIG. 1 shows a process flow diagram depicting an embodiment of the invention.

Unless otherwise defined, the following terms as used throughout this specification are defined as follows: The term "product" or the like is intended to encompass minerals recovered from the raw material or particulate material utilised in the described process. In particular embodiments, the products are titanium dioxide and at least one of magnesium, aluminium, calcium sulphate and silica, or their corresponding salts (if applicable).

The term "particulate material" is intended to encompass a raw material ground to small particles to permit contact of the sulphuric acid with each species of metal oxide. In particular embodiments, the particulate material has a particle size of less than 180 μm. In preferred embodiments, the particulate material has a particle size from 10 to 18011 m, or from 40 to 110 μm. In particular embodiments, the particulate material has a particle size of approximately 30 μm, 45 μm, 60 μm, 70 μm, 80 μm, 90 μm, or 100 m.

The term "filter cake", "cake" and the like refers to solid material present on a filter or membrane following evacuation of liquid (typically acid) from the mixture. In particular embodiments, the filter cake comprises titanyl sulphate and at least one of magnesium sulphate, aluminium sulphate, calcium sulphate and silica.

The term "residue" is intended to encompass a solid material from which water soluble metal sulphates have been recovered following a leaching process. In particular embodiments, the residue comprises calcium sulphate (gypsum) and silica. In particular embodiments, the residue further comprises unreacted metal oxides.

The term "free acidity" refers to the portion of the total acidity that exists in the form of acid, both ionized and un-ionized.

The term "reactor" includes any device consisting of one or more vessels and/or towers or piping arrangements in which materials of the invention can be processed, mixed and/or heated. Examples of reactors of the invention include continuous or batch infusion reactors.

The terms "mixture", "solution" and "permeate" are used throughout the specification, wherein the constituents alter depending on the stage of the process in which the terms are used. Where appropriate, the term "mixture" refers to a liquid with at least one solid substance in suspension. The term "solution" refers to an aqueous substance. The term "permeate" refers to a liquid obtained from a filtration process. Throughout this specification and any claims which follow, unless the context requires otherwise, the words "comprise", "comprising", "contain", "containing" and the like, are to be construed in an inclusive sense as opposed to an exclusive sense, that is to say, in the sense of "including, but not limited to".

"Perovskite" refers to a titanium-calcium oxide mineral composed of calcium titanate $CaTiO_3$. Perovskite typically has a cubic crystalline structure although the term as used herein is intended to refer to any form of calcium titanate. The terms perovskite and calcium titanate are used interchangeably.

"Fluid" refers to a material comprising one or more compounds that is able to flow. The fluid may also include one or more liquids, dissolved substances, suspended substances or solid substances.

"Calcining" refers to a process whereby a substance is heated to a high temperature but below the melting or fusing point, causing loss of moisture, reduction or oxidation, and the decomposition of carbonates and other compounds.

"Gypsum" is $CaSO_4.2H_2O$. This term and "calcium sulphate" or $CaSO_4$ are used interchangeably throughout this specification.

The term "titanyl sulphate" is intended to cover other sulphate forms of titanium which may also be present following sulphation. Those of skill in the art will appreciate such further titanium sulphate reactants.

"Titanium dioxide hydrate" as referred to herein is intended to encompass solutions containing both titanium dioxide and titanium dioxide hydrate and any degree of hydration of the titanium dioxide. It will be appreciated by those of skill in the art that the product of the hydrolysis of titanyl sulphate will be a mixture of titanium dioxide and titanium dioxide hydrate. Unless the context requires otherwise, where the term titanium dioxide is referred to herein, it will be understood that titanium dioxide hydrate may also be present in any proportion. Likewise, unless the context requires otherwise, where the term titanium dioxide hydrate is referred to herein, it will be understood that titanium dioxide may also be present in any proportion. Where a proportion, ratio or percentage of titanium dioxide in a feedstock is referred to, it will be appreciated by a person skilled in the art that the actual form of the titanium dioxide may not be in a form appropriate to be purified. For example in perovskite, the form of the titanium dioxide is predominantly as calcium titanate ($CaTiO_3$). Where analytical results referring to titanium dioxide are provided, those analytical results give the amount of titanium dioxide that may be bound with other elements, for example in calcium titanate.

A "melter" refers to any apparatus appropriate to use high temperatures to convert a solid mineral into a molten state. This term is also intended to incorporate smelters and blast furnaces. While the following description focuses on particular embodiments of the invention, namely the production of titanium dioxide and at least one of magnesium sulphate, aluminium sulphate, calcium sulphate and silica using melter slag from a steel manufacturing process as the primary feedstock, it should be appreciated that the invention may be applicable to production of alternative minerals and the use of alternative feedstocks as will be known by persons of ordinary skill in the art to which the invention relates.

A "system" comprises pipework and other features that would be typically employed to enable the extraction of minerals from a particulate feed. By way of example, the "system" may include pressure valves, heat exchangers, filters, instrumentation (pressure sensors, flow sensors, pH sensors) and mixing tees (static mixers).

As discussed hereinbefore, the inventors have devised methods for recovering valuable products from titanium-bearing minerals, such as calcium titanate or perovskite, in a way that is commercially viable. In particular, the present invention provides methods for extraction of titanium dioxide and at least one of magnesium sulphate, aluminium sulphate, calcium sulphate or silica from melter slag, preferably from an iron-manufacturing process. In the case of melter slag, the process is surprisingly advantageous in that a number of high value minerals can by extracted from a material that is otherwise considered a waste product. In addition the invention provides a means for extracting said minerals that is economically efficient (e.g. is not energy intensive/does not require excessive heating steps) compared to methods known in the art.

In one embodiment, the inventors provide a method for the extraction of the products titanium dioxide, aluminium sulphate, magnesium sulphate, calcium sulphate and silica from a waste material using environmentally sustainable methods, including recycling extraction acids. Achieving the successful extraction of these products provides commercial advantages by enabling further value to be extracted from what is currently a waste product (perovskite). Accordingly, in a further aspect, the invention provides a method of minimising waste from a titanium dioxide-containing product from an iron-making process. Minimising waste also has environmental advantages including reduction of pollution and reduction of land use for iron slag.

FIG. 1 shows an embodiment of the invention in which minerals 1 are ground in a grinder 2 to produce a particulate material. The particulate material is contacted with sulphuric acid from an acid holding tank 3 in a sulphation reactor 4 before being filtered in a first filtration unit 5 to produce a permeate comprising sulphuric acid 6, and a filter cake 7. The filter cake is contacted with water 8 to form a sulphated suspension in a reactor 9. The sulphated suspension is filtered in a second filtration unit 10 to yield a retentate comprising insoluble residue 11 and a permeate comprising at least titanyl sulphate. Water 12 is added to the permeate which is then passed to a hydrolysis reactor 13. Following hydrolysis, the fluid is filtered in a third filtration unit 14 and precipitated material (predominantly titanium dioxide hydrate) is removed in a retentate 15. The permeate is passed to a precipitation tank 16 in which aluminium sulphate is precipitated. The precipitate is then separated by filtration in a fourth filtration unit 17. The retentate comprising aluminium sulphate is removed 18 and the permeate passed to a second precipitation tank 19. Following precipitation of dissolved magnesium sulphate, the fluid is filtered in a fifth filtration unit 20 and a retentate comprising magnesium sulphate 21 collected. The permeate (comprising predominantly acid) is collected and may be recycled 22 through an acid regeneration plant 23.

Accordingly, in one aspect, the invention provides a method of recovering titanium dioxide and at least one other product from a particulate material, said method comprising:
a. contacting the particulate material with sulphuric acid and heating to form a sulphated mixture;
b. filtering the sulphated mixture to produce a filter cake and a first permeate comprising sulphuric acid;
c. contacting the filter cake with water to form a sulphated suspension comprising titanyl sulphate;
d. filtering the sulphated suspension to produce a permeate comprising at least titanyl sulphate, and a retentate comprising insoluble residue;
e. contacting the permeate comprising at least titanyl sulphate with water to produce a hydrolysis liquor;
f. hydrolysing the titanyl sulphate; and
g. separating titanium dioxide hydrate from the hydrolysis liquor,
wherein the at least one other product is selected from the group consisting of calcium sulphate, silica, aluminium sulphate or magnesium sulphate.

Unless indicated otherwise, the order of steps described in the methods described herein is very much preferred and has been optimised by trials carried out by the inventors to ensure that the process provides an efficient yield and an economically viable recovery method.

Feedstock

The feedstock used in the process is a titanium-bearing mineral. However, for ease of describing the process, the feedstock exemplified is melter slag from an iron manufacturing process. Melter slag is typically a by-product of the iron or steel manufacturing process, produced at the melter stage of the process. It is commonly used as an aggregate for road building and surfacing.

In particular embodiments, the material is iron slag. In particular embodiments, the material is melter slag from an iron manufacturing process. In particular embodiments, the material is melter slag from a steel manufacturing process. Melter slag is primarily comprised of perovskite by mass ($CaTiO_3$) in a mixed metal oxide matrix. An example of melter slag constituents is provided below in Table 1, which details the constituents of melter slag produced in New Zealand by NZ Steel's steel manufacturing process.

TABLE 1

| NZ Steel Melter Slag | |
|---|---|
| Constituent | m % |
| $TiO_2$ | 32.1 |
| $Al_2O_3$ | 17.8 |
| MgO | 13.3 |
| CaO | 15.9 |
| $SiO_2$ | 15.2 |
| $Fe_2O_3$ | 2.34 |
| $V_2O_5$ | 0.2 |

In order to prepare the feedstock for use in the process, the raw material (e.g. melter slag) is preferably ground into a particulate material by any means known by persons of ordinary skill in the art. The rate and efficiency of mineral extraction from perovskite is dependent on the grind size. In particular embodiments, the material is ground to less than 180 μm. In preferred embodiments, the material is ground to approximately 45 μm.

Accordingly, in particular embodiments, any of the methods of recovery of products described herein may contain the further step of grinding raw material comprising one or more of the constituents in table 1 to form particulate material. In particular embodiments, the particulate material has a particle size of less than 180 μm. Having this particle size provides for efficient sulphation of the oxides. However, using the methods described herein, the inventors have found that a smaller particle size is only beneficial up to a point. If the particle size is reduced too far, for example to less than around 10 μm, the efficiency of the filtration step to remove acid is reduced. It is believed that this reduction in efficiency is caused by the filter becoming blocked. Accordingly, in preferred embodiments, the particulate material has a particle size from 10 to 180 μm, or from 40 to 110 μm. In particular embodiments, the particulate material has a particle size of approximately 30 μm, 45 μm, 60 μm, 70 μm, 80 μm, 90 μm, or 10 μm.

A skilled person will appreciate the methods to achieve particle size reduction. In one embodiment, the grinding is carried out in a ballmill. Particle size may be measured according to methods known to those of skill in the art, for example laser diffraction.

The inventors have found that the relatively high level of titanium dioxide and other materials in melter slag make it a suitable feedstock for use in the recovery methods described herein. Accordingly, in particular embodiments, the invention provides a method of recovering at least one product from a particulate material comprising greater than 8 m %, greater than 10 m %, greater than 15 m % greater than 20 m % or greater than 25 m % titanium dioxide. Generally the higher the titanium dioxide content, the more valuable the particulate material, and the more economically viable the process of recovery is. Accordingly, it is preferably that the particulate material comprises at least than 15 m % titanium dioxide.

One of the key advantageous aspects of the methods of the invention described herein is the ability to recover more than one substantially purified product from the particulate material. By doing this, the waste from the process is reduced, and the products can be used or sold separately. This increases the economic viability of the process and reduces land use for storage of the waste material. Accordingly, the invention provides a method of recovery of titanium dioxide and at least one other product selected from silica, calcium sulphate, aluminium sulphate and magnesium sulphate.

The inventors have found that the order of the steps in the method described herein is an important factor in optimising yields of the most valuable materials. Early trials by the inventors (see example 3, samples 7, 8, 9 and 10) tested the aluminium sulphate precipitation step prior to the titanium dioxide production and recovery step (i.e. hydrolysis). The yield of titanium dioxide when hydrolysis was carried out after aluminium sulphate precipitation was lower than when carried out before, probably due to co-precipitation of the two components. Accordingly, it is preferable to carry out titanium hydrolysis prior to aluminium sulphate precipitation. This is especially true where the ratio of titanium dioxide to aluminium oxide is relatively low (see example 1 table 3). Additionally, the step of magnesium sulphate precipitation is carried out after the precipitation of aluminium sulphate and titanium dioxide. If magnesium sulphate precipitation is carried out prior to recovery of either aluminium sulphate or titanium dioxide, the co-precipitation of these components with magnesium sulphate would reduce the economic viability of the method and reduce the purity with which the products could be obtained.

In particular embodiments, the invention provides a method of recovering titanium dioxide and at least one other product from a particulate material comprising greater than 8 m %, greater than 10 m %, greater than 15 m % greater than 20 m % or greater than 25 m % titanium dioxide, and greater than 10 m % or greater than 13 m % aluminium oxide. It is particularly preferable to use a feedstock comprising at least 15 m % titanium dioxide and at least 13 m % aluminium oxide. The method preferably comprises carrying out the step of titanium hydrolysis prior to aluminium sulphate precipitation when the ratio of titanium dioxide to aluminium oxide ($TiO_2:Al_2O_3$) 0.2 to 2.6, more preferably 0.25 to 2.1.

Metal Sulphation

The particulate material is introduced to an appropriate reactor, such as a fusion reactor, where it is combined with the desired amount of sulphuric acid to form a sulphated mixture. Although it would generally be thought of as being inefficient to use a large stoichiometric excess of reagents in a reaction, the inventors have found that a substantial excess of sulphuric acid results in decreased viscosity of the sulphated mixture. In particular, it was found that using a stoichiometric excess of two times or less results in a highly viscous mixture that is difficult to pump. Accordingly, in particular embodiments, the particulate material is contacted with greater than 2 times, and preferably 4-10 times its stoichiometric quantity of sulphuric acid. In preferred embodiments, the particulate material is contacted with between 5 and 6 times, or approximately 6 times its stoichiometric quantity of sulphuric acid.

The key reactions relating to the processes and which are used by the inventors to determine the stoichiometric quantities of reaction components are:

$$CaTiO_3 + 2H_2SO_4 \rightarrow CaSO_4 + TiOSO_4 + 2H_2O$$

$$MgO + H_2SO_4 \rightarrow MgSO_4 + H_2O$$

$$Al_2O_3 3H_2SO_4 \rightarrow Al_2(SO_4)_3 + 3H_2O$$

In particular embodiments, the sulphuric acid is introduced to a sulphation reactor in the form of a concentrated acid solution, wherein the particulate material is contacted with the acid solution to form an aqueous sulphated mixture. The inventors have found that if the acid strength is too low (i.e. the amount of $H_2SO_4$ molecules by mass in the acid solution is too low), the reaction will fail to proceed, or will proceed at a rate that is too low to be economically viable. Accordingly, in particular embodiments, the sulphuric acid concentration is at least 50 m %. A low acid concentration also affects the overall titanium dioxide yield. Therefore the strength of the acid is preferably greater than 70%, preferably 90%. In other embodiments, the acid concentration is at least 60 m %, 70 m %, 80 m %, 90 m % or 98 m %.

In particular embodiments of the first aspect, the sulphated mixture is heated to achieve substantially complete sulphation of the oxides (particularly titanium dioxide/calcium titanate) present. In particular embodiments, the sulphated mixture is heated to at least 100° C. following contact with sulphuric acid. In preferred embodiments, the mixture is heated to at least 200° C., preferably 250° C., in the sulphation reactor. The inventors have found that using a temperature of over 250° C. is generally undesirable due to the apparatus constraints of using very hot acid. Preferably, the temperature is between 130° C. and 200° C., more preferably approximately 150° C.-160° C.

In particular embodiments, preheated air or steam is introduced to the reactor, preferably through the bottom of the reactor. The air/steam is allowed to rise through the mixture in order to heat the mixture to the point where reaction commences. The purpose of this heating step is to decrease the reaction time of the metal oxides converting to sulphates, and to evaporate the water as it is evolved, so as to maintain a high free acidity. High free acidity is desired so that the sulphate salts precipitate, and can be filtered afterwards.

In particular embodiments, the sulphated mixture is heated such that substantially complete sulphation of the calcium titanate/titanium dioxide occurs. During heating, the viscosity of the mixture increases as a function of the liquid content decreasing as the evolved water evaporates. In particular embodiments, the mixture is heated for, a heating period which allows substantially complete sulphation of the oxides (in particular calcium titanate/titanium dioxide) to occur. In one embodiment, the heating period is at between 15 minutes and one hour. In particular embodiments, the heating period is at least 30 minutes or approximately 40 minutes.

In particular embodiments, following the heating step, the mixture is further dehydrated using a membrane in order to increase the free acidity of the mixture. In particular embodiments, the free acidity of the mixture exceeds 70% following dehydration.

It will be appreciated by those of skill in the art that heating of a mixture may be achieved in any appropriate way. In one embodiment, one or more of the components of the mixture may be pre-heated and the heat transferred to the mixture during mixing. References to "heating" of a mixture herein are intended to encompass heating of one or more of the components of that mixture prior to mixing.

Leaching

The sulphated mixture is next subjected to a first filtration step (otherwise known as leaching) in order to remove the sulphuric acid. Accordingly, the method of recovering products from a particulate material comprises the step of filtering the sulphated mixture in a suitable filtration unit to produce a filter cake and a permeate comprising sulphuric acid. The inventors found during trials that a higher acid content in the filter cake had an inhibitory effect on the downstream process steps including hydrolysis and precipitation of metal sulphates. Accordingly, the step of acid recovery using a first filtration unit was introduced. This had the effect of reducing acid concentration and provided unexpected efficiency increases of downstream process steps including hydrolysis and precipitation i.e. increased product yield.

Those of skill in the art will understand that any appropriate filtration unit (filter) may be used for this purpose and exemplary filtration units will be known to them. In particular embodiments, the filtration unit comprises a filter press. In one embodiment, the filtration unit is assisted by a differential pressure gradient across the filter. Preferably, the pressure differential is at least 1 bar. In particular embodiments, the mixture is circulated through a filtration unit which permits acids to pass through, while a solid filter cake is collected on the surface of the filter. In particular embodiments, the pressure differential across the filter is from 2 to 10 bar. Preferably, the pressure differential is approximately 6 bar. Using a filter cake is particularly advantageous to achieve maximum acid extraction from the sulphated mixture. At this stage, the filter cake is comprised of titanyl sulphate and at least one of magnesium sulphate, aluminium sulphate, calcium sulphate or silica.

It is desirable to reduce the acid content of the filter cake as much as possible. Preferably, the moisture content of the filter cake is reduced to less than 30%, more preferably less than 20%, or between 15 and 20%. The remaining liquid in the filter cake is largely acid. In particular embodiments, this first filtration step further comprises contacting the filter cake with compressed air. The compressed air acts as an agitator to evacuate acid from the filter and filter cake, and dries the filter cake further. The temperature of the compressed air is preferably below 85° C. to prevent the premature hydrolysis of titanyl sulphate. In particular embodiments, the temperature of the compressed air is from 10° C. to 85° C. Although the compressed air is expected to assist with drying the filter cake at any temperature, the inventors have found that using a heated compressed air stream assists in maintaining the temperature of the filter cake and the subsequent sulphated suspension. Accordingly, it is preferable that the compressed air is from 30° C. to 85° C., or approximately 50° C., 60° C., 70° C. or 80° C. If the temperature of the compressed air is too low (i.e. lower than 35° C.), the viscosity of the sulphated suspension is increased which can detrimentally affect fluid flow.

Sulphuric acid recovered from the mixture is preferably passed to an acid regeneration plant. The collected sulphuric acid may then optionally be reused in the metal sulphation step described previously, wherein recycle of the sulphuric acid provides an economic and environmental advantage. In particular embodiments, the sulphuric acid is processed prior to being recycled for use in the metal sulphation step.

The filter cake remaining on the filter now has a minimal acid content. Water is circulated through the filter cake in order to dissolve the soluble salts from the filter cake. Preferably, the filter cake is washed on the filter and water is passed through the filter. Alternatively, the filter cake is washed with water and the solution does not pass through the filter. Optionally, the filter cake is removed and washed in a separate vessel. In situ washing (i.e. on the filter) reduces the need for an extra tank. Preferably, the filter cake is agitated using vibration or mechanical agitation during washing. Preferably, the temperature of the filter cake during washing is less than 80° C. If higher temperatures are used, the inventors have found that partial or complete hydrolysis of the titanyl sulphate occurs thus reducing downstream titanium dioxide yield. The water may be obtained from any appropriate source. This step produces a solution comprising titanyl sulphate and at least one of magnesium sulphate and aluminium sulphate. In particular embodiments, an insoluble residue remains on the filter comprising calcium sulphate and silica. The solution comprising titanyl sulphate and at least one of magnesium sulphate and aluminium sulphate is optionally passed to a membrane that dehydrates the solution to produce a substantially concentrated solution of the metal sulphates. Concentration using the membrane may be by known membrane concentration methods including reverse osmosis.

The method of recovering products further comprises the step of filtering the sulphated suspension to produce a retentate comprising an insoluble residue and a permeate comprising at least titanyl sulphate. In particular embodiments, the insoluble residue of the retentate comprises silica and calcium sulphate. In particular embodiments, the permeate comprises titanyl sulphate, aluminium sulphate and magnesium sulphate.

Silica/Calcium Sulphate Separation

The inventors have found that the perovskite product produced from melter slag often has a high amount of silica and calcium oxide present. These components are relatively low value and are often viewed as problematic waste products that contaminate compositions containing higher value materials such as titanium dioxide. However, through extensive trials, the inventors have found that these components can be extracted in a substantially purified form as silica and calcium sulphate. Both products have use in industry, for example in the production of tyres and in the production of gypsum for building materials respectively. The inventors have found that sulphation of the calcium oxide and removal as an insoluble residue prior to titanium sulphate hydrolysis provides a particularly efficient and cost-effective method of recovery of these components. In addition, where the particulate material also contains quantities of at least one of aluminium oxide and magnesium oxide, removal of the insoluble residue comprising silica and calcium sulphate enables the recovery of substantially pure titanium dioxide, and at least one of aluminium sulphate and magnesium sulphate in later method steps. Overall, these steps and their order contribute to providing an inventive, cost-effective and industrially efficient method of recovering said products with minimal waste.

In particular embodiments, the invention provides a method of recovering titanium dioxide and at least one other product from a particulate material comprising greater than 8 m %, greater than 10 m %, greater than 15 m % greater than 20 m % or greater than 25 m % titanium dioxide, and greater than 10 m %, greater than 15 m % or greater than 20 m % silica. In other embodiments, the invention provides a method of recovering titanium dioxide and at least one other product from a particulate material comprising greater than 8 m %, greater than 10 m %, greater than 15 m % greater than 20 m % or greater than 25 m % titanium dioxide, and greater than 15 m %, greater than 20 m % or greater than 25 m % calcium oxide.

In some embodiments, the invention provides a method of recovering titanium dioxide and at least one other product from a particulate material comprising greater than 8 m %, greater than 10 m %, greater than 15 m % greater than 20 m % or greater than 25 m % titanium dioxide, greater than 10 m %, greater than 15 m % or greater than 20 m % silica, and greater than 15 m %, greater than 20 m % or greater than 25 m % calcium oxide.

Where the method comprises a step of recovering calcium sulphate and/or silica, the insoluble residue may be processed to obtain these products. This residue is typically comprised of calcium sulphate, resulting from the cleavage of calcium titanate and the sulphation of calcium oxide, and silica. Quantities of unreacted metal oxides are typically present also, as a result of being encapsulated by a refractory material.

In one embodiment the insoluble residue of the retentate from the filtration of the sulphated suspension step is passed to a floatation tank and at least one of calcium sulphate and silica is separated according to known methods.

In one aspect of the invention, there is provided a method of recovering products from a raw material containing perovskite, silica, aluminium oxide and magnesium oxide, said method comprising:
a) grinding a material comprising perovskite, silica, aluminium oxide and magnesium oxide to produce a particulate material;
b) contacting the particulate material with sulphuric acid to form a mixture containing titanyl sulphate, gypsum, silica, aluminium sulphate and magnesium sulphate;
c) filtering the mixture to remove the sulphuric acid;
d) contacting the mixture with water to dissolve the mixture and separating the mixture using filtration to produce a solution comprising titanyl sulphate, aluminium sulphate and magnesium sulphate and a residue comprising gypsum and silica;
e) cooling the solution to a temperature at which aluminium sulphate crystalizes and recovering the resulting crystalized aluminium sulphate;
f) precipitating the solution to produce titanium dioxide;
g) cooling the remaining solution to a temperature at which magnesium sulphate crystalizes and recovering the crystalized magnesium sulphate; and
h) calcining the titanium dioxide to remove residual acid and water to produce substantially pure titanium dioxide.

Due to the difference in density between calcium sulphate and silica, and the hydrophilic nature of silica, calcium sulphate can be separated and recovered from silica using a floatation process. In particular embodiments, calcium sulphate is recovered from the residue using a froth floatation process. In particular embodiments, the residue is ground and/or cleaned prior to being subjected to a froth floatation process. In particular embodiments, the residue is subjected to a pre-floatation step prior to the floatation process in order to recover unreacted metal oxides. In particular embodiments, the residue is subjected to a post-floatation step following the floatation process in order to recover unreacted metal oxides. The pre/post-floatation step preferably comprises a floatation process using xanthates and/or hydroxamates to scavenge unreacted metal oxides. The pre/post-floatation step may also be used to recover sulphates that were not dissolved during leaching.

In alternative embodiments, the calcium sulphate may be recovered from the insoluble residue by precipitation methods known to those of skill in the art.

Concentration of Permeate Comprising Titanyl Sulphate

A low free acidity is desirable for the titanium hydrolysis reaction to proceed efficiently. The free acidity of the liquor following leaching (i.e. the first permeate) or aluminium precipitation/crystallisation is generally too high to permit direct application of the liquor. Since acid is produced in the hydrolysis reaction, the inventors have found that it is desirable to minimise acid flow-through from the earlier sulphation step. Doing this minimises equipment constraints and costs around using highly concentrated acids. The inventors found that an effective way to minimise acid flow-through to the hydrolysis reaction is to first increase free acidity by removing water from the liquor, then precipitate the metal sulphates and separate them from the acid. In particular embodiments, the free acidity of the permeate comprising titanyl sulphate and optionally at least one of magnesium sulphate and aluminium sulphate is first raised such that the metal sulphates precipitate and are more easily separated from the acid. In particular embodiments, the free acidity is raised by heating the solution to a temperature at which the water evaporates. Preferably the permeate comprising titanyl sulphate is heated to greater than 100° C., more preferably greater than 130° C. and most preferably to greater than 160° C. or to boiling point. Since the liquor contains a high concentration of acid, the boiling point is approximately 160° C. In alternative embodiments, the free acidity is raised by contacting the solution with a membrane capable of dehydrating the solution, preferably to remove substantially all water.

Once the free acidity of the solution has been raised, the solution is filtered in order to remove substantially all acids and produce a filter cake on the surface of the filter. Following filtration, water is circulated through the filter in order to dissolve the soluble salts from the filter cake. This step is similar in nature to the leaching step described previously, and produces a reduced-acid permeate comprising titanyl sulphate and optionally at least one of magnesium sulphate and aluminium sulphate. In this embodiment, the permeate is filtered to remove residual acids and the resulting filter cake is contacted with water to obtain a concentrated permeate comprising at least titanyl sulphate.

Titanium Sulphate Hydrolysis

Titanium hydrolysis refers to the cleavage of sulphate from titanium. The reaction is as follows:

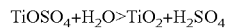

$$TiOSO_4 + H_2O > TiO_2 + H_2SO_4$$

Experiments carried out by the inventors indicate that the optimal free acidity of hydrolysis liquor ranges from 8-25%. Experiments have indicated that at lower than 8% free acidity, the hydrolysis liquor is unstable which is undesirable. This is due to firstly, the hydrolysis of titanyl sulphate can spontaneously occur at room temperature while standing. Secondly, the rate of hydrolysis is difficult to control. During hydrolysis the rate of hydrolysis is in part controlled by the free acidity. If the rate of hydrolysis exceeds approximately 1% per-minute, new nucleation sites are generated in solution resulting in a wide size distribution of titanium dioxide aggregate, which is undesirable for pigment production. Accordingly, in some embodiments, the free acidity of the hydrolysis liquor comprises at least 8% free acidity. A free acidity of greater than 25% is undesirable as the hydrolysis reaction does not proceed to completion even when heated and seeded. The hydrolysis of titanyl sulphate is under equilibrium control, as titanyl sulphate is hydrolysed free sulphate ions are produced hence increasing free acidity in the hydrolysis liquor. According to the Le Chatelier's principle, the concentration of the product (free acid) directly controls the forward rate of the reaction. Hence, a high starting free acidity in the hydrolysis liquor can slow or completely stop the hydrolysis of titanyl sulphate. Accordingly, in some embodiments, the free acidity of the hydrolysis liquor comprises at less than 25% free acidity. In some embodiments, the free acidity of the hydrolysis liquor comprises between 8% and 25%. Within this specified range, the hydrolysis of titanyl sulphate can proceed to completion in a controlled manner resulting in hydrated titanium dioxide of a particularly suitable size distribution for pigment production.

Having achieved a solution which has an appropriate level of free acidity, and preferably in which the titanyl sulphate is concentrated, the step of hydrolysing the titanyl sulphate is initiated. Hydrolysis comprises adding water to the permeate comprising titanyl sulphate (and optionally at least one of magnesium sulphate and aluminium sulphate) to produce a hydrolysis liquor and heating the hydrolysis liquor. Hydrolysis is carried out in a hydrolysis reactor appropriate to contain the reactions described herein. Preferably the hydrolysis liquor is heated to a temperature between 80 and 140° C., between 85 and 140° C. or between 85 and 120° C. The inventors have found that a minimum activation energy for the hydrolysis reaction must be achieved by heating the liquor. In a particular embodiment, the hydrolysis liquor is heated to between 90° C. and 120° C. The inventors have found that a particularly efficient temperature which initiates the reaction quickly while maintaining energy efficiency is from 105° C. to 110° C.

Preferably the hydrolysis liquor is heated for a period such that substantially all of the titanyl sulphate has reacted. A skilled person will be able to determine when all of the titanyl sulphate has reacted. In particular embodiments, the heating period is from one hour to three hours. More preferably from 90 minutes to two hours or approximately 100 minutes. In particular embodiments, the solution is heated for about two hours at a temperature above 85° C. in order for hydrolysis to be completed.

In particular embodiments, the hydrolysis process comprises contacting the solution with water containing titanium dioxide or rutile and heating the solution to a temperature between 85 to 120° C. In preferred embodiments, titanium dioxide particles or nanoparticles, also referred to as seed particles, or nuclei, are added to the hydrolysis liquor. The titanium dioxide particles act as nucleating sites for crystallization, so as to achieve uniform particle formation. The titanium dioxide particles may be added to the hydrolysis liquor or the water added to form said liquor. The titanium dioxide particles may be added and the hydrolysis liquor heated to any of the temperature ranges described herein for hydrolysis. Preferably, the amount of titanium dioxide particles added to the hydrolysis liquor is between 1 m % and 30 m % of the mass of the titanium dioxide calculated to be present in the liquor. More preferably, between 2 m % and 15 m % and preferably between 5 m % and 8 m %. Preferably, the particle size of the titanium particles added to the liquor is from 2 nm to 10 nm, more preferably 3 to 6 nm or approximately 5 nm. Titanium dioxide particles may be anatase, or obtained therefrom.

Separation of the hydrated titanium dioxide may be achieved by methods known to those of skill in the art. In particular embodiments, separation is carried out in a separation unit adapted to receive the hydrolysis liquor and separate titanium dioxide hydrate.

In particular embodiments, the separation unit comprises a second filtration unit adapted to receive the hydrolysis liquor and produce a retentate comprising titanium dioxide hydrate. In alternative embodiments the separation unit comprises a centrifugation unit adapted to separate the precipitated titanium dioxide hydrate.

In an alternative embodiment to the hydrolysis process described above, the hydrolysis liquor may instead be subjected to a sonication process in order to precipitate titanium dioxide hydrate from the solution. In this embodiment, the bulk fluid requires less heating or does not require heating.

Preferably, the step of separation of the titanium dioxide hydrate may be carried out by filtering the hydrolysis liquor to produce a permeate, and a retentate comprising titanium dioxide hydrate. In alternative embodiments, the titanium dioxide is removed by centrifugation and collection of the precipitate.

Filtration of the hydrolysis liquor is carried out in a suitable filtration unit in order to recover the hydrated titanium dioxide. In preferred embodiments, the hydrolysis liquor remains heated to a maximum of approximately 80° C. in order to keep the titanium dioxide particles large enough to be captured by the filtering medium. The permeate preferably comprises aluminium sulphate and magnesium sulphate.

The titanium dioxide recovered from the hydrolysis or sonication process may be calcined (heated) in an oxidative environment by passing heated air through the product, which removes any residual sulphuric acid and water. In preferred embodiments, the titanium dioxide is heated to 950° C. in a reactor for about an hour. In other embodiments, the heating period is from 30 minutes to two hours. In particular embodiments, calcining is carried out at a temperature of between 800 and 1050° C., between 850° C. and 950° C., or between 890 and 910° C. The recovered sulphuric acid can be reused in the sulphation step described earlier. In order to obtain a finished titanium dioxide product, the calcined titanium dioxide is milled, coated and washed. Such processes will be known to those of skill in the art.

Aluminium Sulphate Recovery

Aluminium sulphate is precipitated from the liquor at an appropriate stage. The inventors have found that a higher yield of titanium dioxide can be achieved by carrying out aluminium sulphate precipitation after hydrolysis and titanium dioxide removal (see example 3, samples 7, 8, 9 and 10). It is believed that if aluminium sulphate precipitation is carried out before hydrolysis, some titanyl sulphate is co-precipitated with the aluminium sulphate thus reducing $TiO_2$ yield.

In one embodiment, aluminium sulphate is precipitated from the permeate comprising titanyl sulphate. In another embodiment, aluminium sulphate is precipitated from the permeate comprising magnesium sulphate and aluminium sulphate. These permeates are typically obtained following sulphation and removal of insoluble residue. Alternatively, if the aluminium sulphate is not required to be separated from the insoluble residue, this step of aluminium sulphate precipitation may be carried out before removal of the insoluble residue.

The process of aluminium sulphate precipitation preferably comprises cooling the permeate to a temperature at which aluminium sulphate precipitates and crystalizes. In particular embodiments, the solution is cooled in the same vessel in which the previous filtration step occurred. In alternative embodiments, the solution is passed to a separate tank for cooling.

The crystalized aluminium sulphate is recovered from the solution by any method known to those skilled in the art. The precipitation and recovery step can be carried out on liquors containing aluminium sulphate, for example those produced by the methods described in example 3. Filtration is particularly preferred. In particular embodiments, >90% of the aluminium sulphate present in the solution is recovered during this stage. In particular embodiments, the solution is cooled to between 10 and 4° C. such that the aluminium sulphate crystalizes. In preferred embodiments, the solution is cooled to approximately 5° C.

In particular embodiments, the invention provides a method of recovering at least one product from a particulate material comprising greater than 8 m %, greater than 10 m %, greater than 15 m % greater than 20 m % or greater than 25 m % titanium dioxide, and greater than 10 m % or greater than 13 m % aluminium oxide. The inventors have found that the method provides an economically viable method of recovery of such components when the feedstock meets these component proportions.

Examples 1 and 2 show the deduction of component ratios in particular feedstocks. In particular embodiments, the invention provides a method of recovering titanium dioxide and aluminium sulphate product from a particulate material comprising a ratio of titanium dioxide to aluminium oxide ($TiO_2:Al_2O_3$) in the particulate matter of approximately 0.2 to 2.6, more preferably 0.25 to 2.1. In this embodiment, the inventors have found that the method steps provide particularly economically viable recovery' of titanium dioxide and aluminium sulphate. The titanium hydrolysis step being carried out prior to aluminium sulphate precipitation is particularly preferred at this ratio range. Further, where magnesium sulphate precipitation is also carried out, the titanium hydrolysis step being carried out prior to aluminium sulphate precipitation, which in turn is carried out before magnesium sulphate precipitation is particularly preferred at this ratio range.

In a particular embodiment of the invention, there is provided a method of recovering products from a raw material containing perovskite and aluminium oxide, said method comprising:
a) grinding a material comprising perovskite and aluminium oxide to produce a particulate material;
b) contacting the particulate material with sulphuric acid to form a mixture containing titanyl sulphate and aluminium sulphate;
c) filtering the mixture to remove the sulphuric acid;
d) contacting the mixture with water to dissolve the mixture and separating the mixture using filtration to produce a solution comprising titanyl sulphate and aluminium sulphate;
e) cooling the solution to a temperature at which aluminium sulphate crystalizes and recovering the resulting crystalized aluminium sulphate;
f) precipitating the solution to produce titanium dioxide; and
g) calcining the titanium dioxide to remove residual acid and water to produce substantially pure titanium dioxide.

Magnesium Sulphate Recovery

The solution remaining after subjection to the hydrolysis or sonication process, and optionally removal of aluminium sulphate, typically comprises magnesium sulphate that can also be recovered. The inventors have found that it is preferable to recover magnesium sulphate after recovery of other products because the purity of the resultant magnesium sulphate precipitate is increased if the other components have been removed prior. This is because the methods described below to precipitate magnesium, sulphate would also precipitate aluminium sulphate, titanyl sulphate and other components. If the magnesium sulphate precipitation was not carried out after recovery of the other components, the precipitated mixture would be difficult and uneconomically viable to separate to yield substantially pure components. The resultant lack of value in the mixture increases the probability that it will be disposed of in an uncontrolled and unregulated manner, thus causing environmental degradation.

The precipitation and recovery step can be carried out on liquors containing magnesium sulphate, for example those produced by the methods described in example 3.

In particular embodiments, the method of recovering products comprises the step of increasing the acid concentration of the permeate comprising magnesium sulphate to form an acidified liquor comprising precipitated magnesium sulphate. The increased acidity causes the magnesium sulphate to precipitate. The method preferably further comprises filtering the acidified liquor in to produce a retentate comprising precipitated magnesium sulphate.

In particular embodiments, the acid concentration of the permeate comprising magnesium sulphate is increased by the addition of sulphuric acid. Preferably the pH of the permeate comprising magnesium sulphate is reduced to less than approximately pH1 by the addition of sulphuric acid.

In particular embodiments, the acid concentration of the permeate comprising magnesium sulphate is increased by heating the permeate to remove water. Preferably heating is carried out at boiling point or at a temperature of greater than 130° C.

The inventors have also found that it is preferable to carry out magnesium sulphate precipitation after aluminium sulphate precipitation. The lower precipitation temperature of magnesium sulphate results in aluminium sulphate precipitating first during cooling of a solution comprising both dissolved aluminium sulphate and magnesium sulphate. Accordingly, it is preferable to carry out magnesium sulphate precipitation after aluminium sulphate precipitation. In particular embodiments, the invention provides a method of recovering at least one product from a particulate material comprising greater than 8 m %, greater than 10 m %, greater than 15 m % greater than 20 m % or greater than 25 m % titanium dioxide, and greater than 7 m % or greater than 10 m % magnesium oxide. It is particularly preferable to use a feedstock comprising at least 15 m % titanium dioxide and at least 10 m % magnesium oxide.

In some embodiments, the invention provides a method of recovering titanium dioxide and at least one other product from a particulate material comprising greater than 8 m %, greater than 10 m %, greater than 15 m % greater than 20 m % or greater than 25 m % titanium dioxide, and greater than 7 m % or greater than 10 m % magnesium oxide. It is particularly preferable to use a feedstock comprising at least 15 m % titanium dioxide and at least 10 m % magnesium oxide.

The method preferably comprises carrying out the step of titanium hydrolysis prior to magnesium sulphate precipitation. This enables the yield of titanium dioxide to be maximised and reduces co-precipitation losses of titanium dioxide (or titanium sulphate) that could occur if magnesium sulphate precipitation was carried out prior to titanium dioxide recovery. Examples 1 and 2 show the deduction of component ratios in particular feedstocks. The method preferably comprises carrying out the step of titanium hydrolysis prior to magnesium sulphate precipitation when the ratio of titanium dioxide to magnesium oxide ($TiO_2$:MgO) in the particulate matter is from 0.5 to 3.0, more preferably 0.8 to 2.8.

In some embodiments, the invention provides a method of recovering titanium dioxide and at least one other product from a particulate material comprising greater than 8 m %, greater than 10 m %, greater than 15 m % greater than 20 m % or greater than 25 m % titanium dioxide, and greater than 7 m % or greater than 10 m % magnesium oxide, and greater 10 m % or greater than 13 m % aluminium oxide. It is particularly preferable to use a feedstock comprising at least 15 m % titanium dioxide, at least 13 m % aluminium dioxide and at least 10 m % magnesium oxide.

In some embodiments, the invention provides a method of recovering titanium dioxide and at least one other product from a particulate material comprising greater than 8 m %, greater than 10 m %, greater than 15 m % greater than 20 m % or greater than 25 m % titanium dioxide, greater than 10 m %, greater than 15 m % or greater than 20 m % silica, greater than 15 m %, greater than 20 m % or greater than 25 m % calcium oxide and greater than 7 m % or greater than 10 m % magnesium oxide.

In some embodiments, the invention provides a method of recovering titanium dioxide and at least one other product from a particulate material comprising greater than 8 m %, greater than 10 m %, greater than 15 m % greater than 20 m % or greater than 25 m % titanium dioxide, greater than 10 m %, greater than 15 m % or greater than 20 m % silica, greater than 15 m %, greater than 20 m % or greater than 25 m % calcium oxide, greater than 10 m % or greater than 13 m % aluminium oxide and greater than 7 m % or greater than 10 m % magnesium oxide.

In a particular embodiment, the invention provides a method of recovering titanium dioxide and at least one other product from a particulate material comprising greater than 8 m % titanium dioxide, greater than 10 m % silica, greater than 15 m % calcium oxide, greater than 10 m % aluminium oxide and greater than 7 m % magnesium oxide. In this embodiment the method provides a commercially viable and useful method for the extraction of these compounds from what was previously viewed as a waste material.

In an alternative embodiment, the invention provides a method of recovering titanium dioxide and at least one other product from a particulate material comprising greater than 15 m % titanium dioxide, greater than 10 m % silica, greater than 15 m % calcium oxide, greater than 10 m % aluminium oxide and greater than 7 m % magnesium oxide.

In particular embodiments, the invention provides a method of recovering titanium dioxide and magnesium sulphate product from a particulate material comprising a ratio of titanium dioxide to magnesium oxide ($TiO_2$:MgO) in the particulate matter of approximately 0.5 to 3.0, more preferably 0.8 to 2.8. In this embodiment, the inventors have found that the method steps provide particularly economically viable recovery of titanium dioxide and magnesium sulphate. The titanium hydrolysis step being carried out prior to magnesium sulphate precipitation is particularly preferred at this ratio. Further, where aluminium sulphate precipitation is also carried out, the titanium hydrolysis step being carried out prior to aluminium sulphate precipitation, which in turn is carried out before magnesium sulphate precipitation is particularly preferred at this ratio range.

In one embodiment, the inventors provide a method of recovering products from a raw material containing perovskite and magnesium oxide, said method comprising:
a) grinding a material comprising perovskite and magnesium oxide to produce a particulate material;
b) contacting the particulate material with sulphuric acid to form a mixture containing titanyl sulphate and magnesium sulphate;
c) filtering the mixture to remove the sulphuric acid;
d) contacting the mixture with water to dissolve the mixture and separating the mixture using filtration to produce a/solution comprising titanyl sulphate and magnesium sulphate;
e) precipitating the solution to produce titanium dioxide;
f) cooling the remaining solution to a temperature at which magnesium sulphate crystalizes and recovering the crystalized magnesium sulphate; and
g) calcining the titanium dioxide to remove residual acid and water to produce substantially pure titanium dioxide.

In particular embodiments, the acidified liquor comprising magnesium sulphate or a permeate comprising magnesium sulphate is cooled to a temperature at which magnesium sulphate crystalizes. In particular embodiments, the solution is cooled in the same reactor in which the previous precipitation, hydrolysis process or sonication process occurred. In alternative embodiments, the solution is passed to a separate tank for cooling.

In particular embodiments, the permeate comprising magnesium sulphate or the acidified liquor comprising magnesium sulphate is cooled to induce precipitation/crystallisation of magnesium sulphate.

In preferred embodiments, the permeate comprising magnesium sulphate or the acidified liquor is cooled to less than 4° C. or between 0° C. and 4° C., more preferably approximately 3° C. In particular embodiments, greater than 90% of the magnesium sulphate present in the acidified liquor or the permeate comprising magnesium sulphate is recovered during filtration. The crystalized magnesium sulphate is recovered from the solution by any method known to those skilled in the art.

In addition, the systems or processes of the invention may optionally include means for regulating and/or controlling other parameters to improve overall efficiency of the process. One or more processors may be incorporated into the system to regulate and/or control particular parameters of the process. For example particular embodiments may include determining means to monitor the composition of mixtures or solutions. In addition, particular embodiments may include a means for controlling the delivery of a mixture or solution to particular stages or elements within a particular system if the determining means determines the mixture or solution has a composition suitable for a particular stage.

In addition, it may be necessary to heat or cool particular system components or mixtures, solutions or additives prior to or during one or more stages in the process. In such instances, known heating or cooling means may be used.

Furthermore, the system may include one or more pre/post treatment steps to improve the operation or efficiency of a particular stage. For example, a pre-treatment step may include means for removing unwanted particulate matter from the ground feedstock prior to the metal sulphation process. Other pre- or post-operations that may be conducted include separation of desired product(s) from particular stages. The invention has been described herein with reference to certain preferred embodiments, in order to enable the reader to practice the invention without undue experimentation. Those skilled in the art will appreciate that the invention can be practiced in a large number of variations and modifications other than those specifically described. It is to be understood that the invention includes all such variations and modifications. Furthermore, titles, headings, or the like are provided to aid the reader's comprehension of this document, and should not be read as limiting the scope of the present invention. The entire disclosures of all applications, patents and publications cited herein are herein incorporated by reference. More particularly, as will be appreciated by one of skill in the art, implementations of embodiments of the invention may include one or more additional elements. Only those elements necessary to understand the invention in its various aspects may have been shown in a particular example or in the description. However, the scope of the invention is not limited to the embodiments described and includes methods including one or more additional steps and/or one or more substituted steps, and/or methods omitting one or more steps.

The reference to any prior art in this specification is not, and should not be taken as, an acknowledgement or any form of suggestion that that prior art forms part of the common general knowledge in the field of endeavour in any country.

EXAMPLES

Example 1—Determination of Composition of Slag from Different Sources

The composition of slag from steel manufacturing facilities was obtained.

Results

TABLE 2

| composition of raw material feedstock | | | | | | |
|---|---|---|---|---|---|---|
| | Component (m %) | | | | | |
| Slag source | $TiO_2$ | $SiO_2$ | CaO | $Al_2O_3$ | MgO | Sum |
| New Zealand | 34.8 | 14.1 | 16.3 | 19.0 | 13.8 | 98.0 |
| South Africa | 28.2 | 16.5 | 16.6 | 13.6 | 14 | 99.2 |

TABLE 2-continued

| composition of raw material feedstock | | | | | | |
|---|---|---|---|---|---|---|
| | Component (m %) | | | | | |
| Slag source | $TiO_2$ | $SiO_2$ | CaO | $Al_2O_3$ | MgO | Sum |
| China 1 | 21.5 | 15.55 | 24.6 | 14.11 | 7.65 | 83.84 |
| China 2 | 16.03 | 24.94 | 32.12 | 14.89 | 7.47 | 96.02 |
| Russia | 9 | 29 | 31 | 14.5 | 12 | 96.54 |

TABLE 3

| ratio of feedstock components to titanium dioxide | | | | |
|---|---|---|---|---|
| | Component ratio | | | |
| Slag source | $TiO_2:Al_2O_3$ | $TiO_2:MgO$ | $TiO_2:SiO_2$ | $TiO_2:CaO$ |
| New Zealand | 1.8 | 2.5 | 2.5 | 2.1 |
| South Africa | 2.1 | 2.0 | 1.7 | 1.7 |
| China 1 | 1.5 | 2.8 | 1.4 | 0.9 |
| China 2 | 1.1 | 2.1 | 0.6 | 0.5 |
| Russia | 0.6 | 0.8 | 0.3 | 0.3 |

Figure 3:
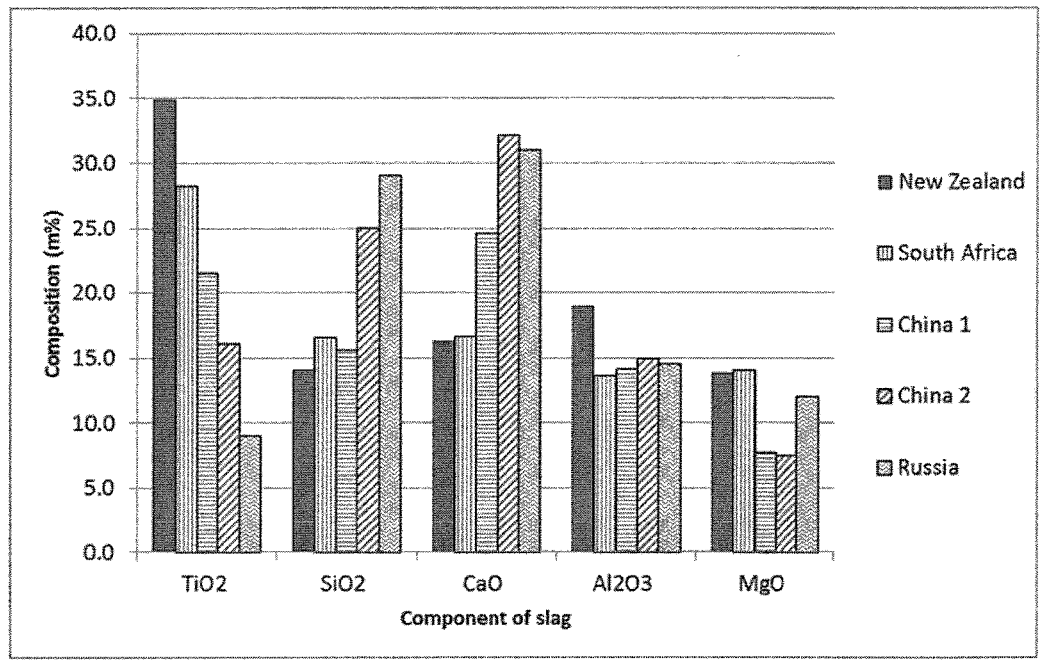
FIG. 3 shows the chemical composition of different slag samples as measured by XRF in example 2 (for New Zealand and South Africa) and obtained from the literature in example 1 (for China and Russia).

FIG. 3 shows the composition of the above slag samples measured by the inventors (for New Zealand) and obtained from the following literature for South Africa, China and Russia:

South Africa—Control of open slag bath furnaces at Highveld Steel and Vanadium Ltd: development of operator guidance tables. Steinberg and Pistorius, Ironmaking and Steelmaking, 2009, vol 36 no. 7. China 1 and China 2-3rd International Symposium on High Temperature Metallurgical Processing. Tao Jiang Jiann-Yang Hwang Patrick Masset Onuralp Yucel Rafael Padilla Guifeng Zhou—9 May 2012. John Wiley & Sons Russia—Titania-containing slag processing method—RU 2295582

CONCLUSION

All five sources of slag for which data were obtained had varying degrees of metal oxides capable of extraction using the methods described herein.

Example 2

Materials and Methods

Six samples containing mixtures of titanium dioxide, aluminium oxide, magnesium oxide, silica and calcium oxide were analysed using x-ray fluorescence spectrometry. The mass percentage composition of these samples was determined and ratios of titanium dioxide to a second component calculated.

Results

TABLE 4

| compositions and component ratios of samples measured using x-ray fluorescence spectrometry | | | | | | | | | |
|---|---|---|---|---|---|---|---|---|---|
| | Component (m %) | | | | | Ratio | | | |
| Slag source | $TiO_2$ | $SiO_2$ | CaO | $Al_2O_3$ | MgO | $TiO_2:Al_2O_3$ | $TiO_2:MgO$ | $TiO_2:SiO_2$ | $TiO_2:CaO$ |
| 1 - NZ-P112-Ti: Ca = 2.1 | 34.8 | 14.1 | 16.3 | 19.0 | 13.8 | 1.84 | 2.52 | 2.47 | 2.14 |
| 2 - ZA-P114-Ti: Al = 2.1 | 30.3 | 19.3 | 15.8 | 15.0 | 12.0 | 2.02 | 2.53 | 1.57 | 1.92 |
| 3 - L108-Ti: Al = 0.3 | 16.1 | 6.0 | 7.7 | 61.5 | 6.7 | 0.26 | 2.40 | 2.68 | 2.09 |
| 4 - L109-Ti: Ca = 0.2 | 15.3 | 6.0 | 58.1 | 8.9 | 7.7 | 1.72 | 1.98 | 2.55 | 0.26 |

TABLE 4-continued compositions and component ratios of samples measured using x-ray fluorescence spectrometry

| Slag source | Component (m %) | | | | | Ratio | | | |
|---|---|---|---|---|---|---|---|---|---|
| | $TiO_2$ | $SiO_2$ | CaO | $Al_2O_3$ | MgO | $TiO_2$:$Al_2O_3$ | $TiO_2$:MgO | $TiO_2$:$SiO_2$ | $TiO_2$:CaO |
| 5 - L110-Ti: Al = 0.3 | 15.9 | 6.0 | 7.7 | 61.7 | 6.7 | 0.26 | 2.38 | 2.65 | 2.06 |
| 6 - L111-Ti: Ca = 0.3 | 19.3 | 7.6 | 49.1 | 11.2 | 9.2 | 1.72 | 2.11 | 2.54 | 0.39 |

Figure 2:
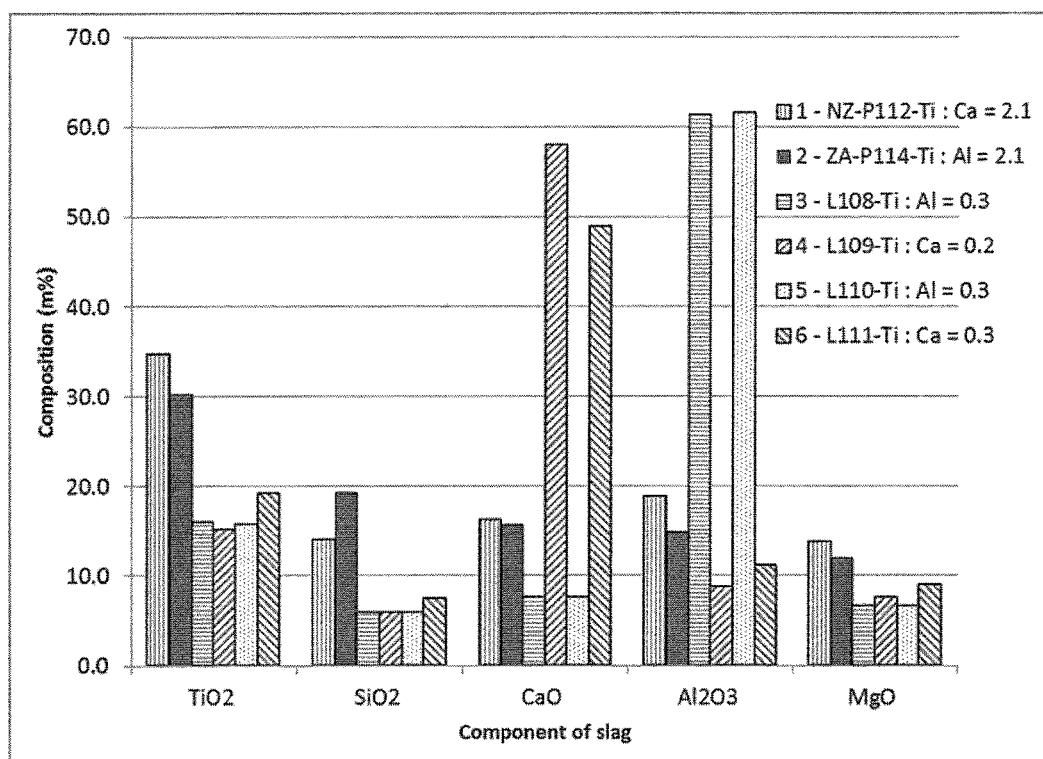
FIG. 2 shows the chemical composition of different slag samples as detailed in example 2.

FIG. 2 shows the composition of samples 1-6.

CONCLUSION

Samples were obtained with a range of compositions. These compositions are representative of a range of industrial slag compositions and core component ratios.

Example 3—Sulphation of Slag Comprising Titanium Dioxide

Materials and Methods
Sulphation and hydrolysis (samples 1 and 3 to 6)
1. 100 g samples of particulate material corresponding to samples 1 to 6 from example 2 were transferred to a 1 L round bottom flask;
2. 1 kg of 98% sulphuric acid was added;
3. the mixture was heated, stirred and held at a temperature of 200° C. for around 4 hours;
4. the resultant sulphated mixture was cooled and filtered through a 46K filter cloth under vacuum;
5. the filter cake was transferred to a 1 L conical flask and washed with 1:1 stoichiometry (mass) of RO water for 2 hours at 70° C.;
6. the mixture was stirred and for approximately 15 hours then filtered through a 46K filter cloth under vacuum to produce a permeate comprising at least titanyl sulphate;
7. the permeate (comprising at least titanyl sulphate) was sampled and the samples subjected to inductively coupled plasma atomic emission spectroscopy (ICP-OES) analysis for titanium, calcium, aluminium and magnesium. The titanium dioxide content of the samples was also analysed using lab titration.
8. the permeate comprising at least titanyl sulphate was transferred to a 1 L round bottom flask and diluted 1:2 stoichiometry (mass) with RO water (3× dilution) to produce a hydrolysis liquor;
9. the hydrolysis liquor was heated to boiling point (approximately 104° C.) for 5 hours with stirring to hydrolyse the titanyl sulphate;
10. the precipitated titanium dioxide was separated from the hydrolysis liquor by centrifugation at 8000 rpm for 20 minutes to pellet the precipitated hydrated titanium dioxide;
11. The remaining hydrolysis liquor was analysed using ICP-OES to determine the amount of remaining titanium, aluminium and magnesium in mg/L. A yield of titanium dioxide was calculated from this value. The amount of aluminium and magnesium remaining (as sulphate salts) for downstream extraction was also measured.

The free acidity of the reaction liquor was measured at the following stages:
a. the filtered acid removed following the initial filtration;
b. the permeate comprising titanyl sulphate from the second filtration; and
c. the hydrolysis liquor remaining after the hydrated titanium dioxide had been precipitated and centrifuged.

Sulphation and Hydrolysis Method (Sample 2)
1. A 1.5 kg sample of sample 2—(P114) (see example 2) was ground to form a particulate material of a particulate size of approximately x μm using a ball mill;
2. 8 L of 98% sulphuric acid was added;
3. the mixture was heated and held at a temperature of 200° C. for around 4.5 hours while under 2 bar pressure and stirred at 300 rpm;
4. the resultant sulphated mixture was cooled and filtered through a 46K filter cloth at 50° C.;
5. the filtration was carried out at 5 bar pressure and blown with compressed air for 30-40 mins;
6. the permeate (comprising at least titanyl sulphate) was sampled and the samples subjected to inductively coupled plasma atomic emission spectroscopy (ICP-OES) analysis for titanium, calcium, aluminium and magnesium. The titanium dioxide content and free acidity of the samples was also analysed using lab titration according to the methods described in example 3.
7. the filter cake was leached with 1:1 stoichiometry (mass) of RO water for 2.5 hours at 70° C. i.e. 3028 g of filter cake was leached with 3000 g of RO water, to produce a hydrolysis liquor; 8. the hydrolysis liquor was then filtered through a 46K filter cloth for 15 mins at 1-3 bar and air blown for 20 mins;
9. The hydrolysis liquor was then transferred to a 3 L round bottom flask and diluted 1:2 stoichiometry (mass) with RO water (3× dilution);
10. this diluted liquor was then heated to boiling to hydrolyse the titanyl sulphate for 5 hours with stirring;
11. the hydrated titanium dioxide was centrifuged out at 8000 rpm for 20 minutes to pellet the precipitated hydrated titanium dioxide;
12. The remaining hydrolysis liquor was analysed using ICP-OES to determine the amount of remaining titanium, aluminium and magnesium. A yield of titanium dioxide was calculated from this value. The amount of aluminium and magnesium remaining (as sulphate salts) for downstream extraction was also measured.

Precipitation of Aluminium Sulphate
13. Following hydrolysis the acidity of the liquor comprising aluminium sulphate was increased to around 40% (w/w) with 98% sulphuric acid.
14. This high acidity liquor was then centrifuged at 8000 rpm and 20° C. for 3 hours to precipitate out the aluminium sulphate and pelletise it for separation.

Titration Method to Determine Concentration of Titanium Dioxide
1. Pipetted out approximately 1 mL of the sample into the 500 mL Erlenmeyer flask and determined the exact mass of the sample.
2. Added 60 mL of 10% HCl, 20 mL of 98% H¬2SO4 and about 1.3 g of aluminium foil.

3. Once the reaction was complete allowed for some cooling to occur. This was when some NaHCO3 was sucked back into the flask and formed a buffering CO2 layer.
4. Added 6 drops of methylene blue indicator while the solution was still warm.
5. Titrated against an acidified 0.1M Cerium sulphate standard.
6. The endpoint of the titration is when the colour changes from pale yellow to pale green.

Determination of Free Acidity
1. Pipetted out approximately 1 mL of the sample into a 500 mL Erlenmeyer flask and determined the exact mass of the sample.
2. Added 100 mL of RO water to the flask
3. Added 4 drops of the phenolphthalein indicator
4. Titrated against a standardised 1M NaOH solution.
5. The endpoint of the titration is when the colour changes from colourless to a slight pink.

Results

Samples subjected to the sulphation method described above were analysed and the compositions of the permeate in table 5 were measured:

TABLE 5 analysis results of permeate produced following filtration

| Sample number | Lab titration results | | ICP-OES results (mg/L) | | | |
|---|---|---|---|---|---|---|
| | Titanium Dioxide (g/kg) | Free Acidity (%) | Titanium | Calcium | Aluminium | Magnesium |
| 1 - NZ-P112-Ti: Ca = 2.1 | 33.76 | 31.54 | 30379 | 159 | 13103 | 10429 |
| 2 - ZA-P114-Ti: Al = 2.1 | 39.15 | 29.47 | 37835 | 478 | 19492 | 18099 |
| 3 - L108-Ti: Al = 0.3 | 22.53 | 32.44 | 18063 | 110 | 26012 | 6287 |
| 4 - L109-Ti: Ca = 0.2 | 16.64 | 31.06 | 11297 | 144 | 5068 | 4799 |
| 5 - L110-Ti: Al = 0.3 | 20.66 | 32.97 | 15723 | 107 | 24542 | 5539 |
| 6 - L111-Ti: Ca = 0.3 | 24.29 | 29.07 | 19852 | 233 | 8341 | 8332 |

The free acidity of the permeate was in a range of 29% to 33%.

Figure 4A:
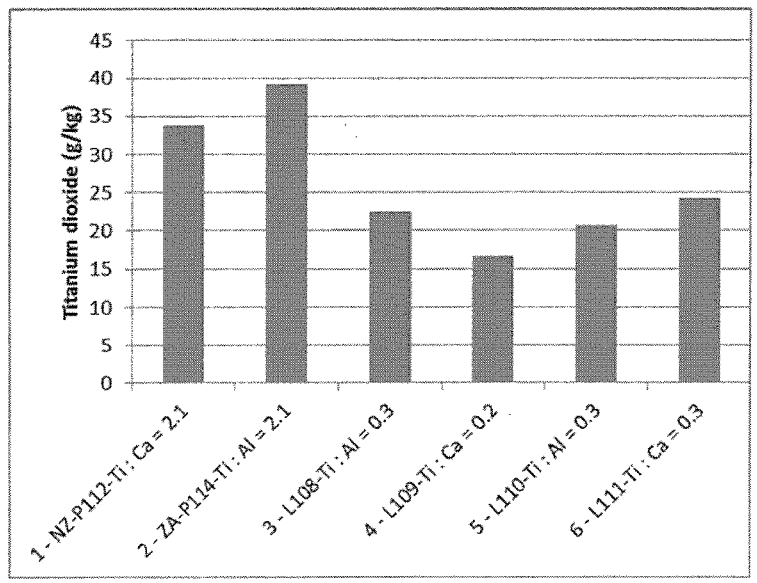
FIG. 4a shows the amount of titanium dioxide measured in the permeate comprising titanyl sulphate as measured by the titration method in example 3.
Figure 4B:
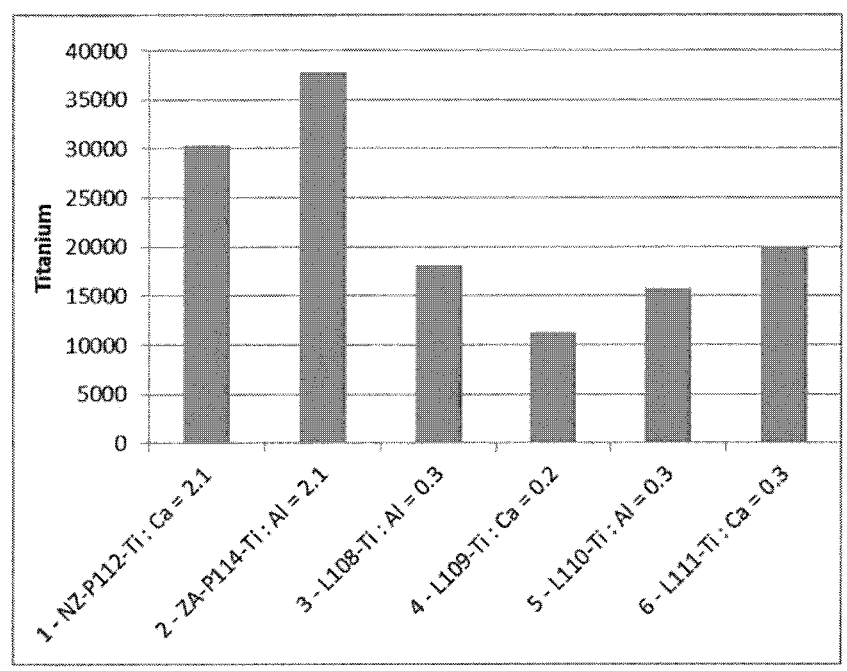
FIG. 4b shows the amount of titanium measured in the permeate as measured by the ICP-OES method in example 3.
Figure 5:
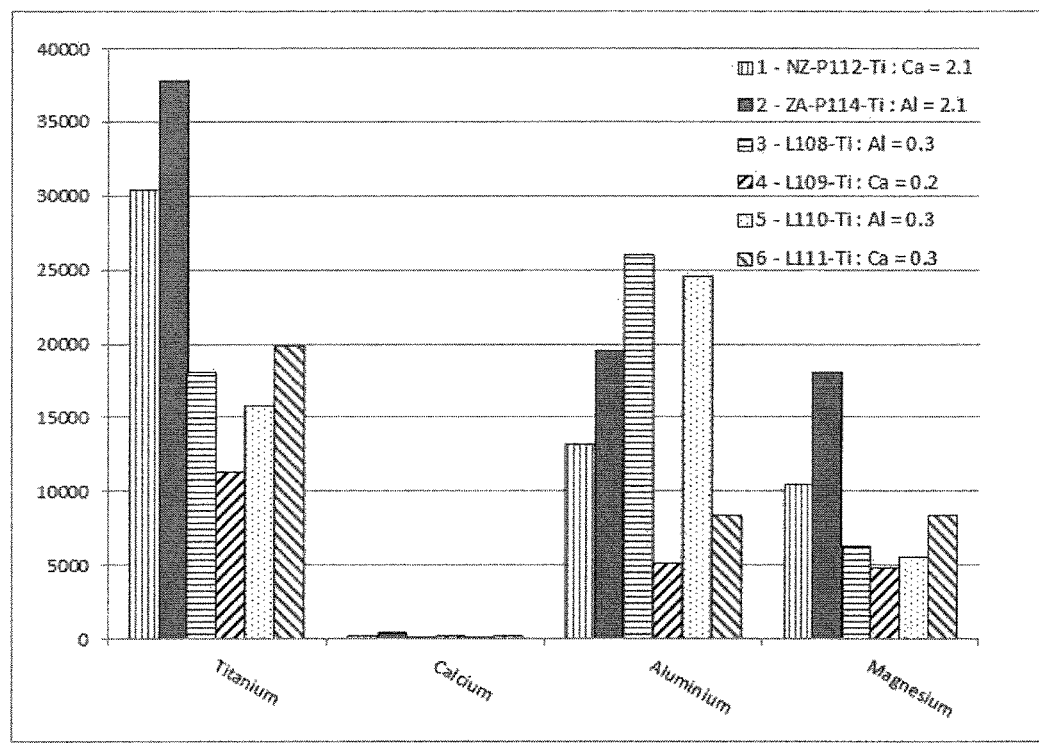
FIG. 5 shows the ICP-OES measurements of titanium, calcium, aluminium and magnesium in the permeate.

FIG. 4a shows the amount of titanium dioxide measured in the permeate comprising titanyl sulphate as measured by the titration method. FIG. 4b shows the amount of titanium measured in the permeate as measured by the ICP-OES method. It can be seen that the measurements obtained using the lab titration method closely correlate to the measurements obtained using the ICP-OES method. FIG. 5 shows the ICP-OES measurements of titanium, calcium, aluminium and magnesium in the permeate.

TABLE 6

ICP-OES results showing titanium present in the permeate comprising titanyl sulphate (prior to hydrolysis) and titanium remaining in the spent hydrolysis liquor (after precipitation of titanium dioxide and centrifugation/filtration to remove the precipitate).

| Sample number | Titanium in permeate (mg/L) | Titanium in spent hydrolysis liquor (mg/L) | Yield (%) |
|---|---|---|---|
| 1 - NZ-P112-Ti:Ca = 2.1 | 30379 | 1546 | 95 |
| 2 - ZA-P114-Ti:Al = 2.1 | 37835 | 4199 | 89 |
| 3 - L108-Ti:Al = 0.3 | 18063 | 1612 | 91 |
| 4 - L109-Ti:Ca = 0.2 | 11297 | 292 | 97 |
| 5 - L110-Ti:Al = 0.3 | 15723 | 1022 | 93 |
| 6 - L111-Ti:Ca = 0.3 | 19852 | 1415 | 93 |

TABLE 7

ICP-OES results showing aluminium and magnesium present in the hydrolysis liquor following removal of titanium dioxide.

| | ICP-OES results (spent hydrolysis liquor) (mg/L) | |
|---|---|---|
| Sample number | Aluminium | Magnesium |
| 1 - NZ-P112-Ti:Ca = 2.1 | 5069 | 3126 |
| 2 - ZA-P114-Ti:Al = 2.1 | 3167 | 2821 |
| 3 - L108-Ti:Al = 0.3 | 6280 | 1552 |
| 4 - L109-Ti:Ca = 0.2 | 1250 | 1253 |
| 5 - L110-Ti:Al = 0.3 | 5362 | 1307 |
| 6 - L111-Ti:Ca = 0.3 | 2377 | 2124 |

TABLE 8

Free acidity of reaction liquor at specific reaction stages.

| | Free acidity (%) | | |
|---|---|---|---|
| Sample number | Filtered acid | Permeate comprising titanyl sulphate | Hydrolysis liquor |
| 1 - NZ-P112-Ti:Ca = 2.1 | 85.53 | 31.54 | 10.7 |
| 2 - ZA-P114-Ti:Al = 2.1 | 90.85 | 29.47 | 9.52 |
| 3 - L108-Ti:Al = 0.3 | 85.23 | 32.44 | 10.85 |
| 4 - L109-Ti:Ca = 0.2 | 86.73 | 31.06 | 10.03 |
| 5 - L110-Ti:Al = 0.3 | 84.27 | 32.97 | 9.52 |
| 6 - L111-Ti:Ca = 0.3 | 83.98 | 29.07 | 9.34 |

In the instance where aluminium sulphate is precipitated first and filtered out, there is a loss of titanyl sulphate to this material stream. Table 9 describes the losses to the precipitated aluminium sulphate due to hold-up of the titanyl sulphate in the aluminium sulphate as it precipitates (occlusion)

TABLE 9

Equivalent titanium dioxide losses when extracting aluminium sulphate prior to hydrolysis

| Sample number | Lab titration results | | Mass Calculations | | | |
|---|---|---|---|---|---|---|
| | Titanium Dioxide (g/kg) | Free Acidity (%) | Mass of Liquor (g) | Mass of TiO$_2$ (g) | Loss of TiO$_2$ (g) | % Loss |
| 7 - L112-Ti: Al = 0.3 Leach Liquor | 16.11 | 27.81 | 678 | 10.92 | | |
| 8 - L112-Ti: Al = 0.3 Post Al Sulphate Precipitation Liquor | 14.01 | 38.43 | 533 | 7.47 | 3.45 | 31.6 |
| 9 - ZA-P114-Ti: Al = 2.1 Leach Liquor | 39.15 | 29.47 | 630 | 24.66 | | |
| 10 - ZA-P114-Ti: Al = 2.1 Post Al Sulphate Precipitation Liquor | 29.05 | 35.22 | 588 | 17.08 | 7.58 | 30.7 |

CONCLUSIONS

The ICP-OES results in table 5 show that substantial quantities of titanium, aluminium and magnesium are dissolved and pass through the filter substantially devoid of insoluble residues and other undesirable impurities. The titanium, aluminium and magnesium in the permeate are in the form of sulphate salts and can be separately precipitated according to the methods described herein.

The free acidity measurements indicate that the permeate comprising titanyl sulphate is in a range of 29% to 33%.

The amount of calcium in the ICP-OES analyses is very low indicating that the calcium oxide present in the original samples (see FIGS. 2/3 and table 4) is precipitated and removed as calcium sulphate during the filtration step.

The yield measurements shown in table 6 indicate a high efficiency extraction of titanium salts (89-97% efficiency. The yield measurements also indicate that the methods described herein are effective and highly efficient for a range of particulate matter compositions and component ratios (see table 4 and FIG. 2).

Table 7 shows that there is a substantial quantity of aluminium and magnesium present in the liquor following hydrolysis and removal of titanium dioxide. These other components (present in the form of sulphate salts) are available for extraction in later method step precipitations.

Table 8 shows that the free acidity of the samples filtered acid is very high. The permeate comprising titanyl sulphate contains a reduced amount of free acid and the hydrolysis liquor contains approximately 10% free acidity. Additional experiments carried out by the inventors indicated that if the free acidity of the hydrolysis liquor is greater than 25%, the hydrolysis reaction is energetically unfavourable and does not proceed, or does not proceed to completion. Additionally, the inventors have found that it is preferable that the hydrolysis liquor contains a free acidity of greater than approximately 8% to enable complete hydrolysis of the titanium sulphate to occur.

Table 9 shows that there are significant losses of equivalent titanium dioxide that would otherwise be available for hydrolysis, in the instance where aluminium sulphate is precipitated prior to hydrolysis. The losses are due in large part to titanyl sulphate being occluded in the coarse aluminium sulphate crystals that form during precipitation. In developing the technique of hydrolysing titanyl sulphate to titanium dioxide prior to aluminium sulphate precipitation, the inventors have improved the economic viability of the process.

A comparison of the two sulphation/hydrolysis methods used shows that they produce comparable results. In a commercial context, the second method (used for sample 2) is generally preferable due to the higher throughput available. Additionally, the inventors contemplate that in a commercial context, the centrifugation step would be replaced by an alternative, higher throughput separation technique such as filtration. Those of skill in the art will appreciate that such separation techniques may be used to obtain the products referred to herein from the liquor/permeate comprising said products.

Example 4—Recovery of Magnesium Sulphate

Materials and Methods
Extraction of Magnesium Sulphate
1. 1000 mL of the liquor is received from the hydrolysis reaction (optionally following recovery of aluminium sulphate). The liquor comprising magnesium sulphate and sulphuric acid is heated to a temperature above 180° C. by placing in a heated, stirred vessel.
2. As the liquor reaches boiling point at 180° C., the concentration of the acid in solution will reach approximately 75%.
3. The liquor is held at 180° C. for 60 minutes
4. The magnesium sulphate in solution will precipitate as the acid concentration rises
5. The liquor is allowed to cool to ambient temperature
6. The liquor and precipitate is filtered in a vacuum filter with 46K cloth
7. The retentate is removed, dried and analysed with XRF to determine composition
8. The permeate will be high concentration sulphuric acid. A sample of this will be analysed for composition with ICP-OES or ICP-MS technique.
9. A sample of the permeate will also be titrated for free acidity Example 5

This example describes a proposed method to achieve higher acid concentration in a permeate comprising magnesium sulphate. This method dehydrates the liquor thus decreasing pH. The higher sulphuric acid concentration results in magnesium sulphate precipitating from the permeate.

A permeate comprising magnesium sulphate is obtained from a method of recovering products from a particulate material as described in example 3. The permeate is passed to a reverse osmosis unit comprising at least one reverse osmosis membrane. The permeate is fed to the unit under a pressure greater than the pressure on the other side of the membrane, for example 1.5 bar.

The retentate is collected and allowed to settle. Magnesium sulphate precipitation occurs spontaneously or may be assisted by cooling or addition of further acid. Precipitated magnesium sulphate is collected via filtration.

The invention claimed is:

1. A method of recovering titanium dioxide and magnesium sulphate from a particulate material comprising perovskite, said method comprising:
   a. contacting the particulate material comprising perovskite with sulphuric acid and heating to a maximum of 250° C. to form a sulphated mixture;
   b. filtering the sulphated mixture to produce a filter cake and a first permeate comprising sulphuric acid;
   c. contacting the filter cake with water to form a sulphated suspension comprising titanyl sulphate;
   d. filtering the sulphated suspension to produce a permeate comprising at least titanyl sulphate, and a retentate comprising insoluble residue comprising calcium sulphate;
   e. contacting the permeate comprising at least titanyl sulphate with water to produce a hydrolysis liquor; and
   f. hydrolysing the titanyl sulphate;
   g. separating titanium dioxide hydrate from the hydrolysis liquor to produce a permeate comprising magnesium sulphate, and a retentate comprising titanium dioxide hydrate to recover the titanium dioxide hydrate; and
   h. precipitating magnesium sulphate from the permeate to recover the magnesium sulphate.

2. The method of claim 1 wherein the retentate comprising insoluble residue comprises silica.

3. The method of claim 1 wherein the precipitation of magnesium sulphate comprises the steps of:
   a. increasing the acid concentration of the permeate comprising magnesium sulphate to form an acidified liquor; and
   b. filtering the acidified liquor to produce a retentate comprising precipitated magnesium sulphate.

4. A method as claimed in claim 3 wherein the acid concentration of the permeate comprising magnesium sulphate is increased by the addition of sulphuric acid.

5. A method as claimed in claim 1 wherein the pH of the permeate comprising magnesium sulphate is reduced to less than pH 1 by the addition of sulphuric acid.

6. A method as claimed in claim 3 wherein the acid concentration of the permeate comprising magnesium sulphate is increased by heating the permeate to remove water.

7. The method of claim 1 wherein the particulate material comprises greater than 8% by mass titanium dioxide and greater than 7% by mass magnesium oxide.

8. The method of claim 1 wherein the particulate material comprises a ratio of titanium dioxide to magnesium oxide ($TiO_2$:MgO) of approximately 0.5:3.0.

9. The method of claim 1 wherein the step of precipitating magnesium sulphate comprises:
   a. cooling the permeate comprising magnesium sulphate or the acidified liquor to produce a cooled liquor comprising magnesium sulphate; and
   b. filtering the cooled liquor comprising magnesium sulphate to produce a retentate comprising precipitated magnesium sulphate, and a permeate.

10. The method of claim 9 wherein the permeate or liquor is cooled to between 0° C. and 4° C.

11. The method of claim 1, further comprising a step of precipitating aluminium sulphate from either:
    a. the permeate produced from the hydrolysis liquor; or
    b. the permeate comprising at least titanyl sulphate.

12. The method of claim 1 wherein the particulate material is selected from the group consisting of iron slag, melter slag, obtained from iron slag, obtained from melter slag, obtained from an iron manufacturing process, and obtained from a steel manufacturing process.

13. The method of claim 1 wherein the method further comprises the step of grinding raw material to form the particulate material of step a.

14. The method of claim 1 wherein the particulate material has a particle size between 10 and 180 μm.

15. The method of claim 1 wherein the particulate material is contacted with 4-10 times its stoichiometric quantity of sulphuric acid.

16. The method of claim 1 wherein the step of filtering the sulphated mixture further comprises contacting the mixture with compressed air.

17. The method of claim 16 wherein the temperature of the compressed air is from 10° C. to 85° C.

18. The method of claim 1 wherein the permeate comprising at least titanyl sulphate is heated to remove water and increase the free acidity.

19. The method of claim 1 wherein the hydrolysis liquor is contacted with water containing titanium dioxide particles.

20. The method of claim 1 wherein the calcium sulphate is recovered.

21. The method of claim 2 wherein the silica is recovered.

22. The method of claim 1 wherein the method further comprises the step of calcining the titanium dioxide hydrate to recover titanium dioxide.

* * * * *